(12) United States Patent
Miki

(10) Patent No.: US 7,363,437 B2
(45) Date of Patent: Apr. 22, 2008

(54) SHARED/EXCLUSIVE CONTROL SCHEME AMONG SITES INCLUDING STORAGE DEVICE SYSTEM SHARED BY PLURAL HIGH-RANK APPARATUSES, AND COMPUTER SYSTEM EQUIPPED WITH THE SAME CONTROL SCHEME

(75) Inventor: Kenichi Miki, Odawara (JP)

(73) Assignee: Hitachi, Ltd., Tokyo (JP)

(*) Notice: Subject to any disclaimer, the term of this patent is extended or adjusted under 35 U.S.C. 154(b) by 487 days.

(21) Appl. No.: 10/819,307

(22) Filed: Apr. 7, 2004

(65) Prior Publication Data

US 2005/0166018 A1    Jul. 28, 2005

(30) Foreign Application Priority Data

Jan. 28, 2004    (JP) ............................. 2004-020230

(51) Int. Cl.
*G06F 12/00* (2006.01)
(52) U.S. Cl. .................. 711/151; 711/114; 711/117; 711/162; 711/158
(58) Field of Classification Search ............... 711/117, 711/162, 114, 151, 158; 707/10
See application file for complete search history.

(56) References Cited

U.S. PATENT DOCUMENTS

| | | | |
|---|---|---|---|
| 5,742,792 A | 4/1998 | Yanai et al. ............... 395/489 |
| 5,828,876 A * | 10/1998 | Fish et al. .................. 707/1 |
| 6,014,669 A * | 1/2000 | Slaughter et al. ........... 707/10 |
| 6,018,779 A * | 1/2000 | Blumenau ................... 710/68 |
| 6,279,032 B1 | 8/2001 | Short et al. ............... 709/209 |
| 6,401,120 B1 | 6/2002 | Gamache et al. ........... 709/226 |
| 6,480,934 B1 | 11/2002 | Hino et al. |
| 6,615,256 B1 | 9/2003 | Van Ingen et al. |
| 2002/0184439 A1 | 12/2002 | Hino et al. |
| 2002/0188768 A1 | 12/2002 | Hirakawa et al. |
| 2003/0014534 A1 | 1/2003 | Watanabe et al. |
| 2003/0074417 A1 | 4/2003 | Kasako et al. |
| 2003/0088746 A1 | 5/2003 | Hino et al. |

(Continued)

FOREIGN PATENT DOCUMENTS

JP    3-76592    4/1991

(Continued)

OTHER PUBLICATIONS

"SCSI-2", 3rd edition, published Feb. 1, 1997 by CQ Publishing Inc.

*Primary Examiner*—Matthew Kim
*Assistant Examiner*—Hetul Patel
(74) *Attorney, Agent, or Firm*—Mattingly, Stanger, Malur & Brundidge, P.C.

(57) ABSTRACT

In a computer system where a site including a storage device system connected to high-rank apparatuses, via a network such as a SAN, and a site including a storage device system similarly connected to high-rank apparatuses via a network are connected to each other via an inter-high-rank-apparatuses network, arbitration-emulation software is installed in each of the high-rank apparatuses. Here, the following two-step arbitration is carried out, thereby determining one high-rank apparatus. Namely, at first, a shared/exclusive control using an already-existing shared volume is performed based on an in-site arbitration within the site. Next, a shared/exclusive control based on an inter-sites arbitration is performed by high-rank apparatuses each of which has won the arbitration within each site.

12 Claims, 13 Drawing Sheets

U.S. PATENT DOCUMENTS

2003/0188218 A1   10/2003   Lubbers et al.
2003/0217119 A1   11/2003   Raman et al.
2004/0103254 A1   5/2004    Satoyama et al.
2004/0153711 A1   8/2004    Brunelle et al.
2004/0153719 A1   8/2004    Achiwa et al.

FOREIGN PATENT DOCUMENTS

JP   2003-76592   3/2003

* cited by examiner

FIG. 5

| CONTENTS | VALUE |
|---|---|
| 110 — SCSI-COMMAND TYPE | Read |
| | Write |
| | Reserve |
| | Release |
| | Reset |
| 120 — SCSI-COMMAND RETURN VALUE | GOOD |
| | Conflict |
| | ERROR |

FIG. 7

| ARBITRATION-VOLUME Reserve STATE IN PRESENT SYSTEM | ARBITRATION-DISK SCSI Reserve STATE | ARBITRATION-VOLUME PAIR STATE (PAIR STATUS) |
|---|---|---|
| 210 | 220 | 230 |
| SELF-NODE LOCK STATE (250) | SELF-NODE Reserve STATE | COPY-SOURCE STATUS |
|  | SELF-NODE Reserve STATE | COPY-DESTINATION STATUS |
| OTHER-NODE LOCK STATE (260) | OTHER-NODE Reserve STATE | COPY-SOURCE STATUS |
|  | OTHER-NODE Reserve STATE | COPY-DESTINATION STATUS |
|  | Non-Reserve STATE | COPY-DESTINATION STATUS |
| NO-LOCK STATUS (ANY NODE IS NOT IN LOCK STATE) (270) | Non-Reserve STATE | PAIR-DIVISION STATUS |
|  | SELF-NODE Reserve STATE | PAIR-DIVISION STATUS |
|  | OTHER-NODE Reserve STATE | PAIR-DIVISION STATUS |
|  | Non-Reserve STATE | COPY-SOURCE STATUS |

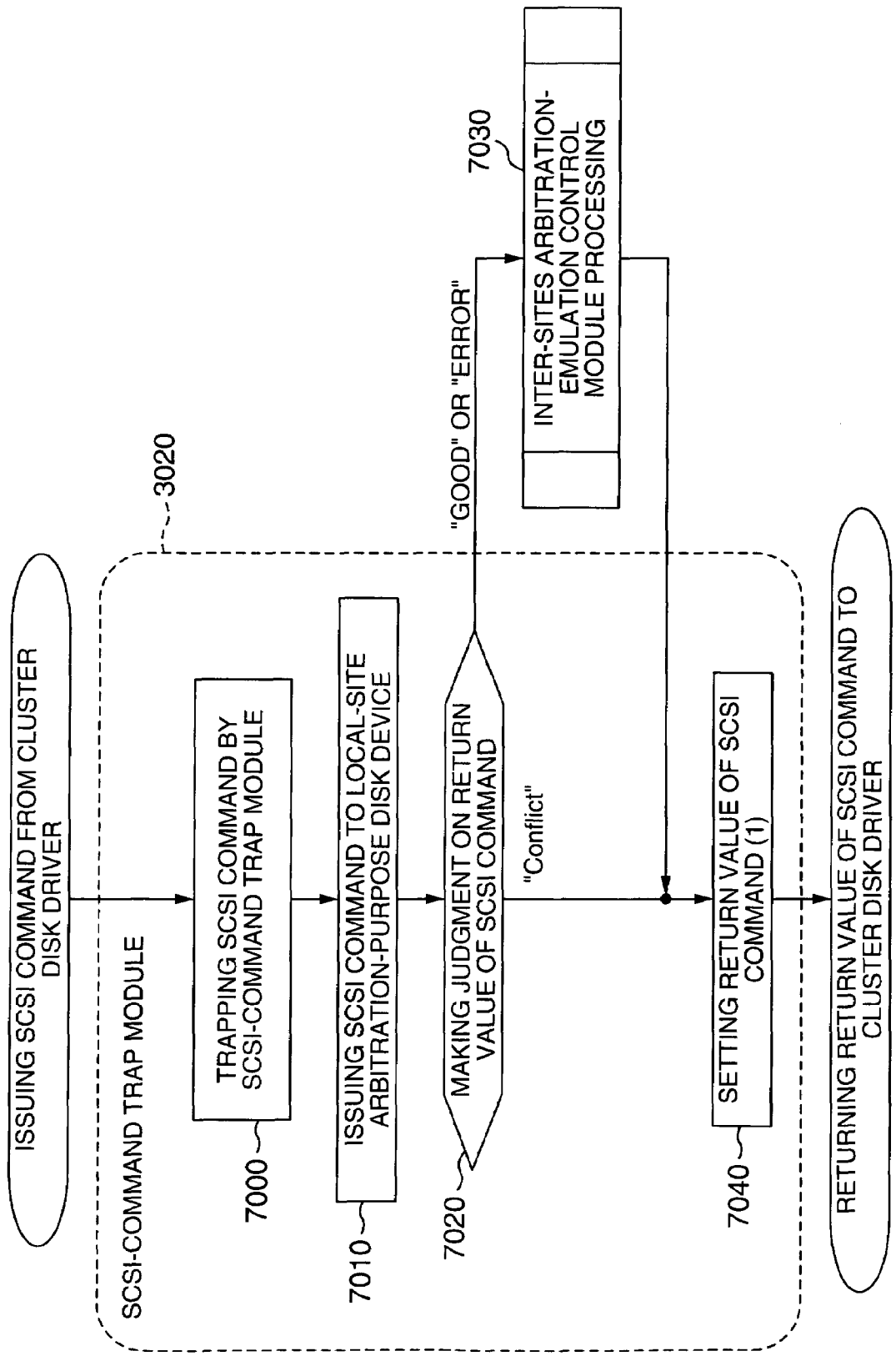

SHARED/EXCLUSIVE CONTROL SCHEME AMONG SITES INCLUDING STORAGE DEVICE SYSTEM SHARED BY PLURAL HIGH-RANK APPARATUSES, AND COMPUTER SYSTEM EQUIPPED WITH THE SAME CONTROL SCHEME

INCORPORATION BY REFERENCE

This application relates to and claims priority from Japanese Patent Application No. 2004-020230 filed on Jan. 28, 2004, the entire disclosure of which is incorporated herein by reference.

BACKGROUND OF THE INVENTION

The present invention relates to data storage systems equipped with an arbitration (i.e., shared/exclusive control) function among plural high-rank apparatuses. Here, the data storage systems exist within a computer system that uses volumes for making data copy into apparatuses such as disk devices which configure storage systems located at remote districts (i.e., remote copy). More particularly, the present invention is a one which is preferable for a shared/exclusive control scheme and its devices in a computer system equipped with a shared/exclusive control function like this.

The present invention provides a computer system that allows the implementation of an arbitration which is preferable for a shared-disk model cluster system constructed using plural high-rank apparatuses including volumes for making the remote copy into remote districts.

In a computer system which has configured an information processing system including host computers, i.e., high-rank apparatuses, and plural storage device systems, i.e., plural storage systems, the remote copy exists as a technology for making data copy among the plural storage device systems. This remote copy is the following technology: Namely, in an information processing system, the remote-copy technology allows plural storage device systems to make copy of data, i.e., double-writing of the data, with each other and without intervention of high-rank apparatuses. Here, the above-described storage device systems exist at places which are physically apart from each other. Also, the storage device systems refer to the so-called storage systems, i.e., the systems each of which includes plural storage devices and a controller for controlling these storage devices.

In the information processing system where the remote copy like this is performed, the storage device systems located at physically apart places are connected to each other via dedicated lines or public lines. The dedicated lines or public lines used for this connection are designated as "remote-copy lines", but hereinafter, will be referred to as "dedicated lines or the like".

Of logical memory areas (hereinafter, referred to as "logical volumes") that a certain storage device system possesses, the logical volume whose capacity is the same as that of a logical volume (hereinafter, referred to as "copy-source logical volume") which becomes the target of a remote copy is reserved within a storage device system into which the copy-source logical volume is to be copied. This logical volume reserved (hereinafter, referred to as "copy-destination logical volume") is formed in such a manner that this logical volume will have a one-to-one correspondence relationship (hereinafter, referred to as "copy pair") with the copy-source logical volume. Data stored in the copy-source logical volume is copied into the copy-destination logical volume via the dedicated lines or the like.

If the data stored in the copy-source logical volume has been updated, the data updated is transferred via the dedicated lines or the like to the storage device system that includes the copy-destination logical volume. As a result, the updated data is written into the copy-destination logical volume corresponding to the copy-source logical volume. The employment of the remote-copy technology allows the logical volumes with the same contents to be held among the plural storage device systems in the information processing system that includes the plural storage device systems.

The creation of the copy pair formed of the copy source and the copy destination determines the copy direction as being a one-way direction, i.e., the direction from the copy source to the copy destination. Each high-rank apparatus finds it possible to perform a Write processing into the copy-source logical volume. Conversely, each high-rank apparatus finds it impossible to perform the Write processing into the copy-destination logical volume. The technology on the remote copy has been disclosed in JP-A-2003-076592, or in U.S. Pat. No. 5,742,792.

Conventionally, based on a shared/exclusive control request from an arbitrary high-rank apparatus, a storage device shared by plural high-rank apparatuses implements the shared/exclusive control over access requests from the respective high-rank apparatuses. For example, in an information processing system where the SCSI (: Small Computer System Interface) is employed as an interface between the high-rank apparatuses and the storage device, the employment of a Reserve-oriented command defined by the SCSI allows the implementation of the shared/exclusive control over the storage device on each logical-volume basis.

If a certain high-rank apparatus has reserved a logical volume of the storage device, the logical volume falls in a state where a Read or Write access from only the high-rank apparatus that has reserved the volume is permissible. Incidentally, concerning the technology on the SCSI, the explanation has been given on Item 6. 15 of "SCSI-2" Detailed Commentary described in "SCSI-2" (3rd ed. published on Feb. 1, 1997 by CQ Publishing Inc.)

In the existing remote-copy technology environment, no consideration has been given to the shared/exclusive control mechanism by the SCSI Reserve-oriented command. When a logical volume within a certain storage device system has been locked by the Reserve-oriented command, the locked state is configured so as not to be transmitted to the remote-copy corresponding logical volume within another storage device system.

As the other shared/exclusive control methods, there exist a Lock-file used method using a shared volume within a storage device to be shared, and a shared/exclusive control method using a specific sector of the disk.

Also, the clustering (which, simply, is also referred to as "cluster") is a publicly-known technology for connecting plural high-rank apparatuses (e.g., host computers or host servers) thereby to make it possible to cause the high-rank apparatuses to behave as if they were a single stand-alone apparatus. The clustering is used for the purpose of parallel processing, load balance, and fault tolerance. The cluster servers, which are the high-rank apparatuses that configure the cluster (i.e., cluster computing system), spread and distribute a computer load or risk in cooperation with each other. Even if, for example, a failure has occurred in one server within the cluster computing system, the operating system finds it possible to transfer the processing in failure to one of the other normally-operating servers within the system. This permits the user to continue the job even during the time-period which elapses until the failed server has been recovered.

The respective high-rank apparatuses in the high-rank apparatus group that configures the cluster are connected via a network for connecting the high-rank apparatus group. This network is, typically, an IP (: Internet protocol) used network such as the Internet. The use of this network allows the respective high-rank apparatuses to communicate their mutual states with each other. This communication is referred to as "cluster communication", or "heart-beat communication".

The cluster of a model where plural high-rank apparatuses are connected to one storage device thereby to configure the cluster computing system is referred to as "shared-disk model cluster. As a model of this shared-disk model cluster, there exists the following one: When the heart-beat communication is lost, the shared/exclusive control is performed using a logical volume within the shared disk, thereby confirming mutual operating states of the high-rank apparatuses. This confirmation is performed in order to prevent the occurrence of a situation where a processing in execution is split and the high-rank apparatuses operate individually (i.e., split brain). This control of preventing the split of a processing is referred to as "arbitration". For example, a Microsoft Cluster Server (hereinafter, abbreviated as "MSCS") is a server equipped with this arbitration function.

Incidentally, the present invention is not limited to the MSCS, but is applicable to the system in general which performs the shared/exclusive control in a computer system using the shared-disk device. Here, however, the present invention will be explained by selecting the MSCS as the example. In the MSCS, the issuing of a SCSI command is performed to a for-management volume (arbitration-purpose disk, arbitration-purpose volume, or quorum disk) for performing the exclusive control, thereby implementing the shared/exclusive control and thus avoiding the split-brain state. Concerning the operation of the Microsoft Cluster, the disclosure has been made in U.S. Pat. No. 6,279,032 and U.S. Pat. No. 6,401,120.

SUMMARY OF THE INVENTION

In the above-described conventional technologies, the type of software for performing the shared-disk preconditioned shared/exclusive control, e.g., the partial cluster software, finds it impossible to perform the shared/exclusive control normally in the remote-copy applied environment, and thus finds it impossible to operate therein.

It is a first object of the present invention to provide a computer system equipped with a unit for allowing the software to operate normally under the remote-copy applied environment. Here, the software is assumed to operate by performing the shared/exclusive control in the shared memory-device environment.

It is a second object of the present invention to provide a computer system equipped with a unit for allowing the shared-volume used arbitration, which is performed by the cluster software MSCS, to operate normally under the remote-copy applied environment.

It is a third object of the present invention to provide a computer system equipped with a unit for allowing the cluster software MSCS to operate normally under the remote-copy applied environment.

The remote-copy environment application of the shared/exclusive control for the above-described first object is implemented as follows: Each high-rank apparatus in the computer system is equipped with an arbitration-emulation software program, and a two-step arbitration is performed in the arbitration-emulation software program of each high-rank apparatus. This two-step arbitration is as follows: First, using the shared/exclusive control employing an already-existing shared volume, a shared/exclusive control within each site is performed. Next, an inter-sites shared/exclusive control is performed by high-rank apparatuses each of which has won the arbitration within each site.

The shared/exclusive control among the sites for the above-described second object is implemented by taking advantage of the following fact: Volumes which form a remote-copy pair have volume attributes of a copy source and a copy destination. Moreover, in the respective volumes which form the remote-copy pair, each single volume is capable of having the volume attribute of the copy source.

The remote-copy environment application of the MSCS for the above-described third object is implemented by trapping the SCSI command issued by the MSCS, and manipulating a return value of the SCSI command. By trapping a Read-oriented command, a Write-oriented command, and a Lock-oriented command of the SCSI command utilized in the arbitration by the MSCS, the MSCS behaves as if the shared/exclusive control employing a single shared volume were being performed. This allows the implementation of the application to the remote-copy environment.

The unit for the above-described first object makes it possible to configure the computer system where the software is capable of operating normally under the remote-copy applied environment. Here, the software is assumed to operate by performing the shared/exclusive control in the shared memory-device environment.

The unit for the above-described second object makes it possible to configure the computer system where the shared-volume used arbitration, which is performed by the cluster software MSCS, is capable of operating normally under the remote-copy applied environment.

The unit for the above-described third object makes it possible to configure the computer system where the cluster software MSCS is capable of operating normally under the remote-copy applied environment.

According to the present invention, volumes, which have formed a remote-copy pair at the time of the remote-copy pair formation between the plural storage device systems, are capable of making copy bidirectionally. Each high-rank apparatus is capable of writing data freely into either of the volumes which have formed the remote-copy pair. As a result, each high-rank apparatus is capable of dealing with, as one and the same storage device system, the plural storage device systems within the sites located considerable distances away from each other. Also, at the time of the remote-copy pair configuration, it becomes possible to propagate a Reserve status between the storage device systems configured as the remote-copy pair. Consequently, at the time of even the remote-copy environment, it becomes possible to utilize the shared/exclusive control by the SCSI Reserve-oriented command or the like.

Other objects, features and advantages of the invention will become apparent from the following description of the embodiments of the invention taken in conjunction with the accompanying drawings.

BRIEF DESCRIPTION OF THE DRAWINGS

FIG. 5 is an explanatory diagram of contact contents between a SCSI-command trap module and an inter-sites arbitration-emulation control module;

FIG. 7 is an explanatory diagram of a Lock-state table of the Lock emulation performed by arbitration-emulation software in the embodiment 1 of the present invention;

FIG. 8 is a flowchart for explaining the entire control flow in the embodiment 1 of the present invention;

DESCRIPTION OF THE INVENTION

Figure 1:
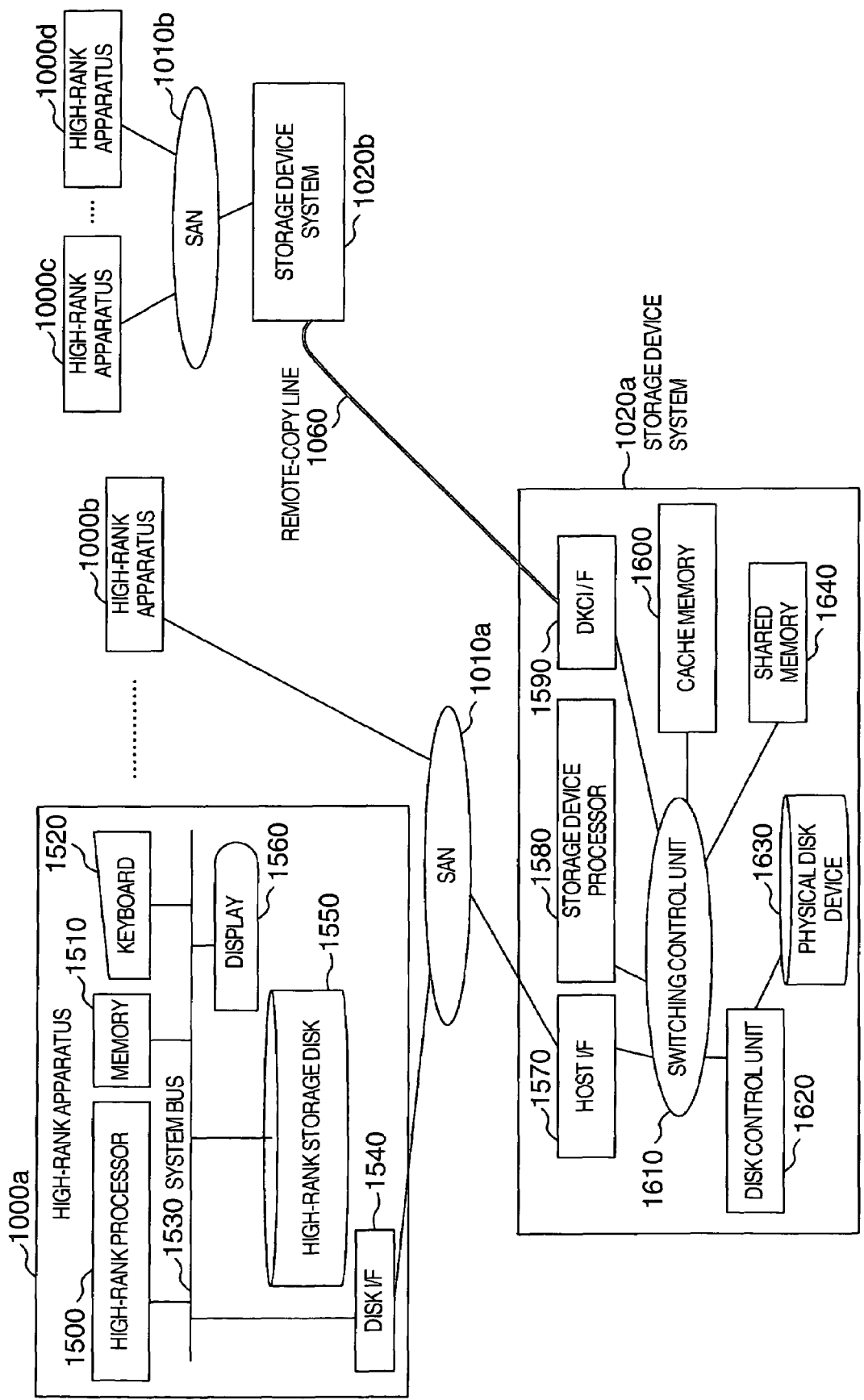
FIG. 1 is a configuration diagram for explaining an example of high-rank apparatuses and storage device systems which configure a computer system of the present invention.

FIG. 1 is a configuration diagram for explaining an example of high-rank apparatuses and storage device systems which configure a computer system of the present invention. Incidentally, each storage device system includes disk array devices, semiconductor storage devices, and the like. In FIG. 1, the computer system includes the following configuration components: The storage device system 1020*a* shared by and connected to the high-rank apparatuses 1000*a*, ..., 1000*b* via a communication network, i.e., a SAN (: Storage Area Network) 1010*a*, and the storage device system 1020*b* similarly shared by and connected to the high-rank apparatuses 1000*c*, 1000*d* via a SAN 1101*b*. The storage device system 1020*a* and the storage device system 1020*b* are connected to each other via a remote-copy line 1060.

The high-rank apparatus 1000*a* includes the following configuration components: A high-rank apparatus processor 1500, a memory 1510, a keyboard 1520, a disk interface (: disk I/F) 1540, a high-rank apparatus memory disk 1550, a display 1560, a system bus 1530 for allowing the communications among these components, and the like. Incidentally, the high-rank apparatuses 1000*b*, 1000*c*, and 1000*d* also include basically the same components.

The high-rank apparatus processor 1500 has a function of performing computations within the high-rank apparatus 1000*a*. The memory 1510 is used as a place into which the operation system and the other software programs for mainly operating the high-rank apparatus are loaded, and into which instructions (i.e., commands) by the programs are memorized at the time of executing the respective programs. The keyboard 1520 is used when performing an input processing into the respective types of software programs which operate within the high-rank apparatus.

The display 1560 is used for displaying outputs from the respective types of software programs or the like which operate within the high-rank apparatus. The disk I/F 1540 is used when performing an input/output (: I/O) request from the high-rank apparatus to an external storage device. As the disk I/F 1540, there exist a one having an SCSI interface, a one having a SAN-environment interface such as a fiber, and the like. The high-rank apparatus memory disk 1550 stores therein program data executed by the high-rank apparatus, and data characteristic of the high-rank apparatus.

The storage device system 1020*a* includes the following configuration components (1020*b* includes basically the same components): A host interface (: host I/F) 1570, a storage device processor 1580, a disk copy interface (: DKC I/F) 1590, a disk control unit 1620, a shared memory 1640, a cache memory 1600, a switching control unit 1610 including a cross bus switch and the like for allowing the communications among these components, a physical disk 1630, and the like.

The host I/F 1570, which is equipped with a CPU and a memory, provides a communications function mainly exhibited with the high-rank apparatus. This host I/F 1570 receives a data I/O (: data input/output) request from the high-rank apparatus, then writing the data I/O request into the shared memory 1640. Incidentally, a CPU and a memory in the DKC I/F 1590 execute a program for implementing the remote-copy function, thereby providing the remote-copy function.

The cache memory 1600 is used for temporarily memorizing data transmitted/received mainly among the host I/F 1570, the DKC I/F 1590, and the disk control unit 1620. If, for example, the data input/output command that the host I/F 1570 has received from the high-rank apparatus is a Write command, the host I/F 1570 writes Write data received from the high-rank apparatus into the cache memory 1600. Also, the disk control unit 1620 reads the Write data from the cache memory 1600, then writing the Write data into the physical disk 1630.

The disk control unit 1620 reads the I/O request written from the host I/F 1570 or the DKC I/F 1590 into the shared memory 1640, then executing a data Write or Read processing into/from the physical disk 1630 in accordance with a command (which is a SCSI command here) set in the I/O request. The disk control unit 1620, in the case of a Read command, writes the data read from the physical disk 1630 into the cache memory 1600. Also, the disk control unit 1620 transmits a data-write or data-read completion notice to the host I/F 1570. The disk control unit 1620, in some cases, equips the physical disk 1630 with a function that, in accordance with a RAID level (e.g., 0, 1, 5) of the so-called RAID (: Redundant Array of Inexpensive Disks) scheme, a single logical volume is located within the plural physical disks in a distributed manner. The physical disk 1630 is, for example, a hard disk device. The physical disk 1630 can be of an integrated type integrated with the storage device system, or can be of a separated type.

The DKC I/F 1590 is a communications interface for performing data transfer with the other storage device system. The data transfer to the other storage device system in the remote copy is performed via this DKC I/F 1590.

Embodiment 1

Figure 2:
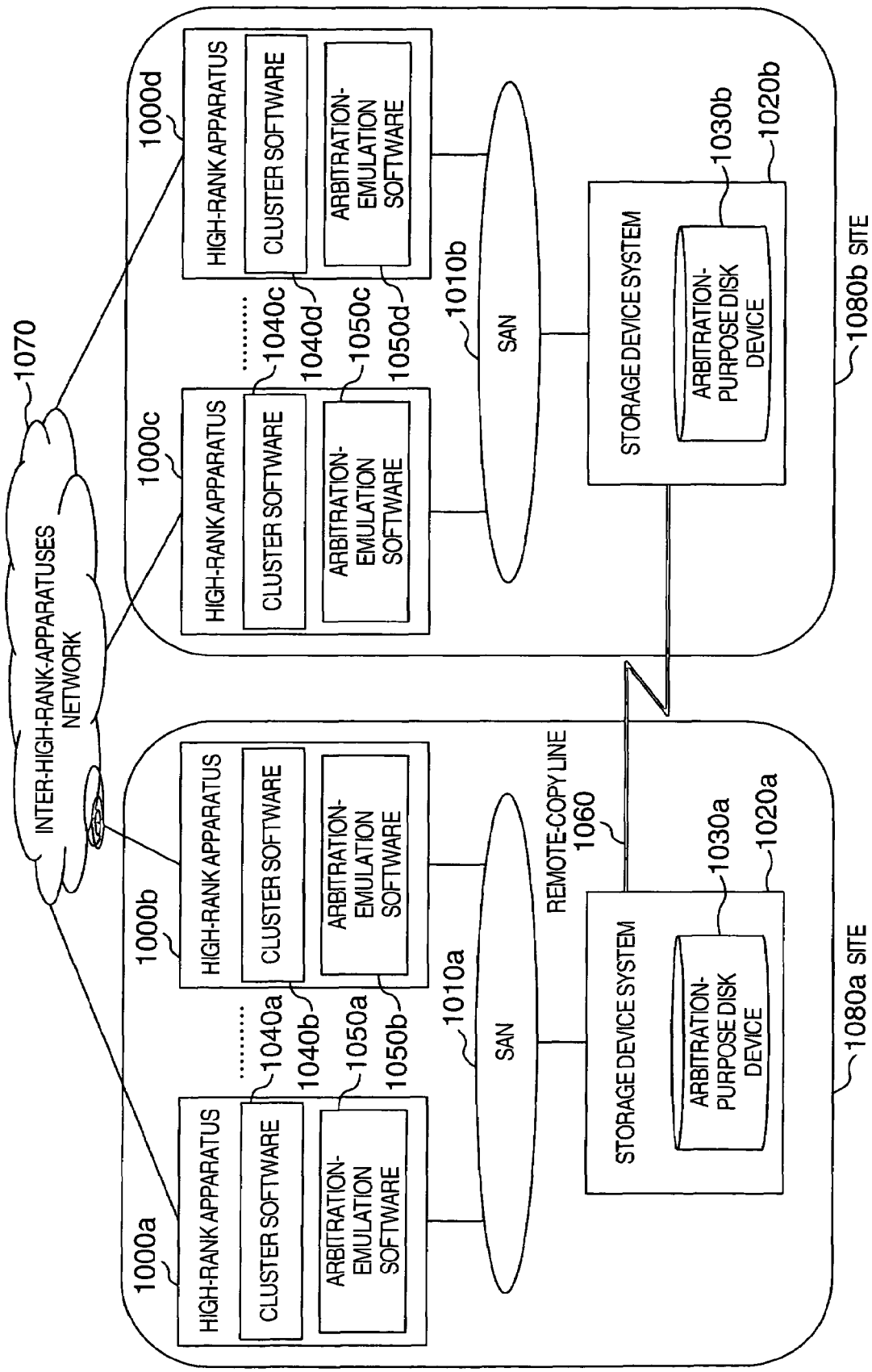
FIG. 2 is a configuration diagram of the computer system to which the present invention is applied.

Hereinafter, referring to the drawings, the computer system of the present invention will be explained in detail. FIG. 2 is a configuration diagram of the computer system to which the present invention is applied. In FIG. 2, this computer system includes the following configuration components: A site 1080a including the plural high-rank apparatuses 1000a, 1000b connected to the storage device system 1020a via the SAN 1010a, and a site 1080b including the plural high-rank apparatuses 1000c, . . . , 1000d connected to the storage device system 1020b via the SAN 1010b. An arbitration-purpose disk 1030a is located within the storage device system 1020a, and a arbitration-purpose disk 1030b is located within the storage device system 1020b.

The following assumptions are made: The storage device system 1020a and the storage device system 1020b are connected to each other via the remote-copy line 1060 using a dedicated line or the like (e.g., dedicated line or public line). The storage device system 1020a and the storage device system 1020b are communicated to each other via the remote-copy line 1060 and using the SCSI protocol, the IP protocol, or the combination of these protocols. The arbitration-purpose disk 1030a and the arbitration-purpose disk 1030b form a remote-copy pair with the remote-copy line 1060 located therebetween.

The following assumptions are made: The high-rank apparatus 1000a, the high-rank apparatus 1000b, the high-rank apparatus 1000c, and the high-rank apparatus 1000d are connected to each other via an inter-high-rank-apparatuses network 1070 using dedicated lines or public lines. The high-rank apparatus 1000a, the high-rank apparatus 1000b, the high-rank apparatus 1000c, and the high-rank apparatus 1000d are communicated to each other via the inter-high-rank-apparatuses network 1070 and using the IP protocol. In particular, with respect to the MSCS which will be explained in the present embodiment, the respective high-rank apparatuses are referred to as "nodes of cluster configuration". The respective nodes configure the inter-high-rank-apparatuses network 1070 by configuring a WAN (: Wide Area Network). This inter-high-rank-apparatuses network 1070 is used for the cluster communication (i.e., heart-beat communication).

Each of the high-rank apparatus 1000a, the high-rank apparatus 1000b, the high-rank apparatus 1000c, and the high-rank apparatus 1000d locates therein clustering units 1040a, 1040b, 1040c, and 1040d including cluster software programs needed to configure the cluster, and arbitration-emulation execution units 1050a, 1050b, 1050c, and 1050d including arbitration-emulation software programs for implementing functions of the present embodiment. Incidentally, in the description hereinafter and the description in the claims, in order to facilitate the understanding, the clustering units will be explained as the cluster software programs 1040a, 1040b, 1040c, and 1040d included therein. Also, similarly, the arbitration-emulation execution units will be explained as the arbitration-emulation software programs 1050a, 1050b, 1050c, and 1050d included therein.

Figure 3:
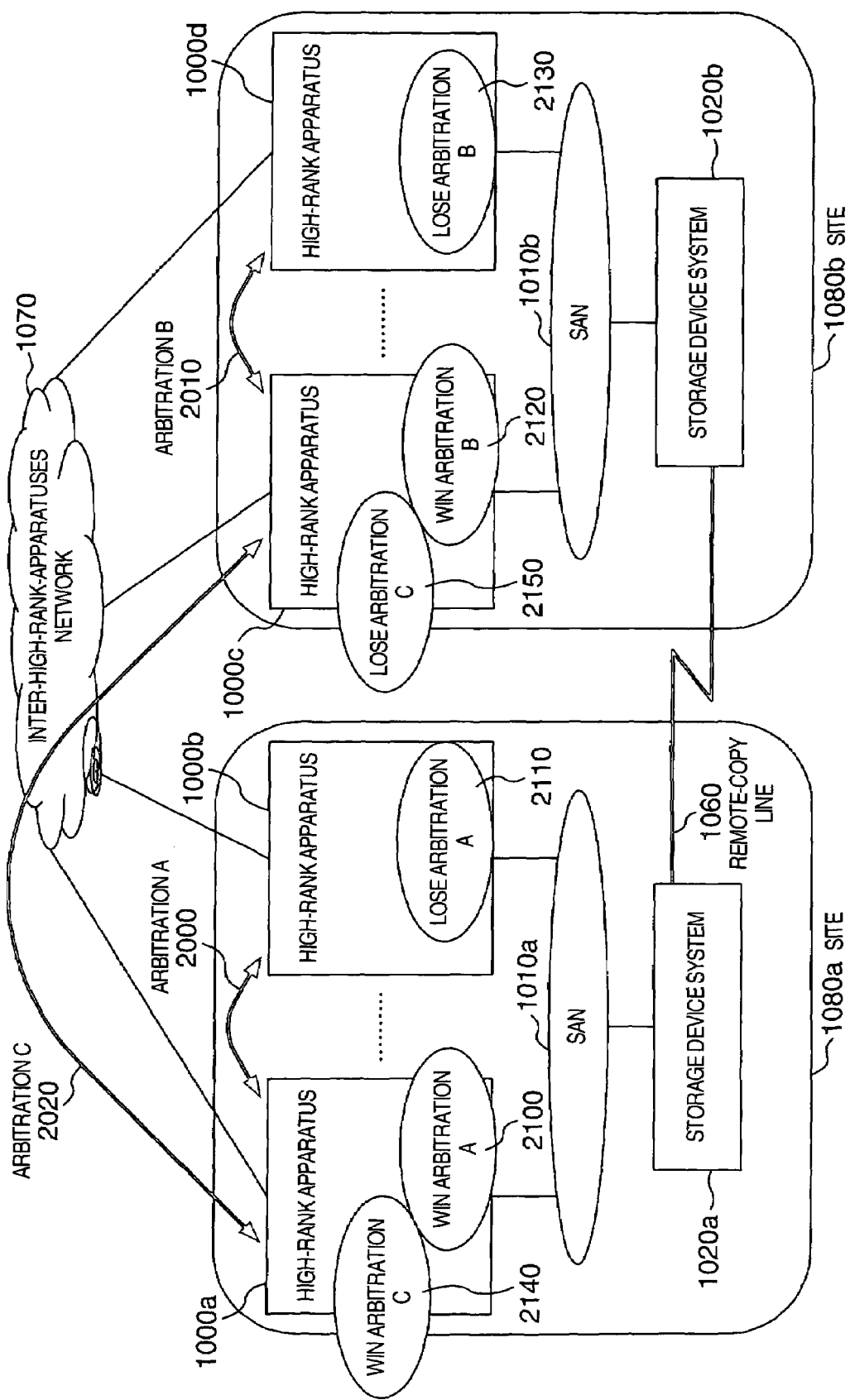
FIG. 3 is a conceptual diagram of the two-step arbitration in the configuration illustrated in FIG. 2.

FIG. 3 is a conceptual diagram of the two-step arbitration in the configuration illustrated in FIG. 2. In FIG. 3, if the heart beat among the high-rank apparatus 1000a and the high-rank apparatus 1000b configuring the site 1080a and the high-rank apparatus 1000c and the high-rank apparatus 1000d configuring the site 1080b has broken off, the respective high-rank apparatuses perform the two-step arbitration in order to acquire the control right of the cluster. The two-step arbitration in the remote-copy environment explained in FIG. 2 is performed in accordance with the following steps:

First, an arbitration within each site is performed. Next, an inter-sites arbitration is performed. Concretely explaining, at the time of the heart beat break-off, an arbitration A 2000 between the high-rank apparatus 1000a and the high-rank apparatus 1000b is performed within the site 1080a. Also, an arbitration B 2010 between the high-rank apparatus 1000c and the high-rank apparatus 1000d is performed within the site 1080b. These arbitration A 2000 and arbitration B 2010 determine, within each site, one high-rank apparatus which has won the arbitration within each site and which has a possibility of acquiring the control right of the cluster.

In the present embodiment, assume that, in the arbitration A 2000, the high-rank apparatus 1000a has "won the arbitration A" 2100 and the high-rank apparatus 1000b has "lost the arbitration A" 2110. Also, assume that, in the arbitration B 2010, the high-rank apparatus 1000c has "won the arbitration B" 2120 and the high-rank apparatus 1000d has "lost the arbitration B" 2130.

After the arbitration A 2000 and the arbitration B 2010 have been terminated, the inter-sites arbitration is performed. In the present embodiment, the inter-sites arbitration of an arbitration C 2020 is performed between the high-rank apparatus 1000a and the high-rank apparatus 1000c each of which has won the arbitration within each site. Here, assume that, in the arbitration C 2020, the high-rank apparatus 1000a has "won the arbitration C" 2140 and the high-rank apparatus 1000c has "lost the arbitration C" 2150. These arbitration A 2000, arbitration B 2010, and arbitration C 2020 determine the in-site arbitration-win high-rank apparatuses and the inter-sites arbitration-win high-rank apparatus sequentially. In this way, a single high-rank apparatus (i.e., the high-rank apparatus 1000a here) is determined which is capable of acquiring the control right of the cluster system under the remote-copy environment.

Figure 4:
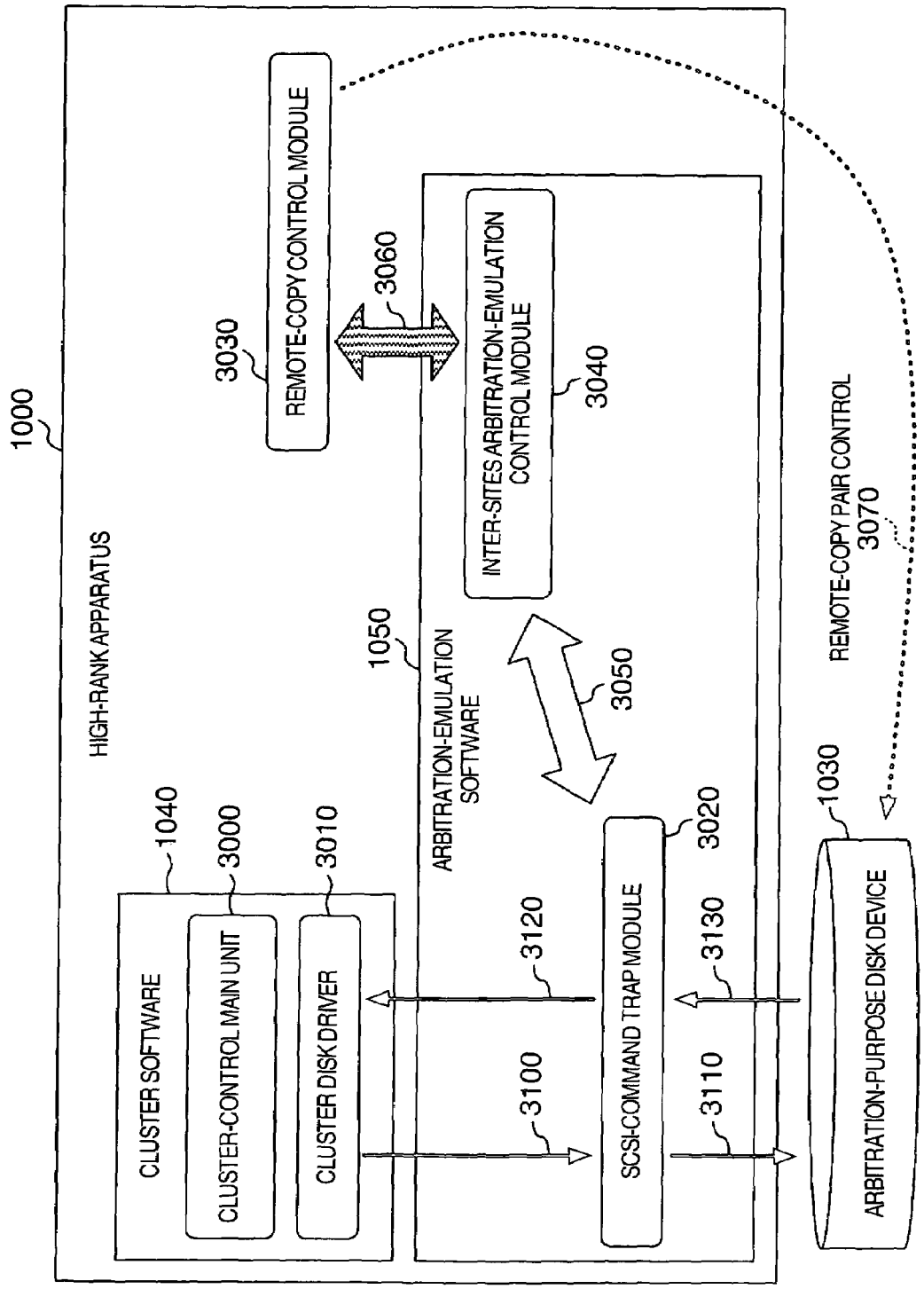
FIG. 4 is an explanatory diagram of the software module configuration within each high-rank apparatus included in the cluster.

FIG. 4 illustrates the software module configuration within each high-rank apparatus included in the cluster. Here, the high-rank apparatus will be explained setting its reference numeral as being 1000. The memory disk (i.e., high-rank apparatus memory disk 1550 in FIG. 1) of the high-rank apparatus 1000 locates therein the cluster software 1040 and the arbitration-emulation software 1050. Also, in addition to these software programs, a software program becomes necessary which allows the high-rank apparatus to control the remote copy. Additionally, the cluster software 1040 used in the present embodiment is the MSCS.

The cluster software 1040 includes a cluster-control main unit 3000 and a cluster disk driver 3010. The cluster-control main unit 3000, which becomes a module for performing the controls over respective types of clusters, performs the cluster communication, performs the management of resources that the cluster manages, and performs the control over the cluster disk driver 3010 in order to perform the arbitration in the cluster. The cluster disk driver (module) 3010 has a function of implementing a shared-volume used shared/exclusive control that the cluster utilizes.

The arbitration-emulation software 1050 includes a SCSI-command trap module 3020 and an inter-sites arbitration-emulation control module 3040. The SCSI-command trap module 3020 is a module that, if a SCSI command has been issued from the cluster disk driver 3010, traps the issued SCSI command before it has reached the arbitration-purpose disk 1030. For example, a SCSI command 3100 issued from the cluster disk driver 3010 to the arbitration-purpose disk 1030 is trapped halfway by the SCSI-command trap module

3020. Moreover, the SCSI-command trap module 3020 issues a trapped SCSI command 3110 to the actually-functioning arbitration-purpose disk 1030, then acquiring a return value 3130 of the issued SCSI command. Also, depending on requirements, the module 3020 performs a processing to be performed via the inter-sites arbitration-emulation control module 3040.

After these processings have been terminated, the SCSI-command trap module 3020 sets a return value 3120 of the SCSI command as the return value of the SCSI command 3100 issued from the cluster disk driver 3010. The inter-sites arbitration-emulation control module 3040 has a function that the SCSI-command trapped by the SCSI-command trap module 3020 and the volume status of the inter-sites remote-copy pair are caused to correspond to each other. Contact contents 3050 between the SCSI-command trap module 3020 and the inter-sites arbitration-emulation control module 3040 will be explained later in FIG. 5.

The inter-sites arbitration-emulation control module 3040 performs the remote-copy pair-relation control (denoted as "remote-copy pair control" in FIG. 4) 3070 via a remote-copy control module 3030. As pair operations by this remote-copy pair-relation control 3070, there exist "pair-formation instruction", "pair-division instruction", and "pair-status confirmation". The "pair-formation instruction" is an instruction of forming the pair. The "pair-division instruction" is an instruction of dividing the pair. The relation between the volume pair-state of the remote copy and the pair operations will be explained later in FIG. 6. Namely, the inter-sites arbitration-emulation control module 3040 issues one of the pair-operation instructions to the remote-copy control module 3030, thereby causing the remote-copy control module 3030 to perform the remote-copy pair-relation control 3070 corresponding to the pair operation instruction.

Figure 6:
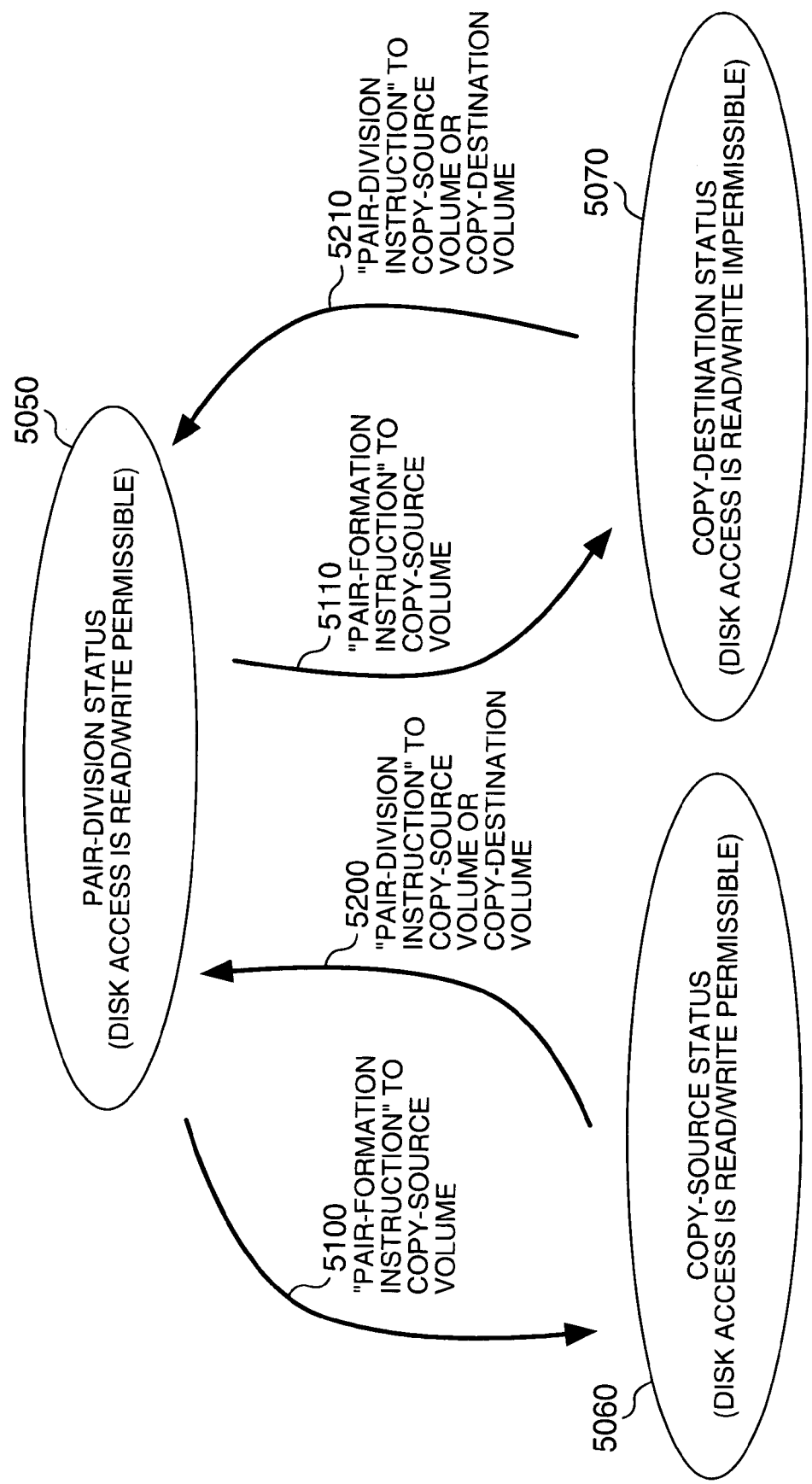
FIG. 6 is a state transition diagram between the volume pair-state (: pair status) and the pair operations.

Namely, the in-site arbitration and the inter-sites arbitration to be performed in the arbitration-emulation software 1050 are performed by the SCSI command issued to the actually-functioning arbitration-purpose disk 1030 in the SCSI-command trap module 3020, and the pair operations performed by the inter-sites arbitration-emulation control module 3040. This makes it possible to implement the exclusive control over the system. FIG. 6 illustrates a condition for indicating the in-site exclusion and the inter-sites exclusions. The relation illustrated in FIG. 6 allows the implementation of the exclusion as the entire system. The arbitration-emulation software 1050 operates so that this relation in FIG. 6 will be satisfied.

FIG. 5 is an explanatory diagram of the contact contents 3050 between the SCSI-command trap module 3020 and the inter-sites arbitration-emulation control module 3040. SCSI-command type 110 indicates the type of the SCSI-command trapped by the SCSI-command trap module 3020. The type-code values are as follows: Read-oriented command, Write-oriented command, Reserve-oriented command, Release-oriented command, and Reset-oriented command.

As a SCSI-command return value (i.e., SCSI status) 120, the SCSI-command return value 120 is set which is normalized for each type-oriented command of the SCSI command. As the SCSI-command return value 120, the status for indicating a success of the SCSI command is represented as "GOOD", and the status at the time of a failure based on the exclusion status by the Reserve-oriented command is represented as "Conflict", and the status at the time of the other failures is represented as "ERROR". With respect to some of the Reserve-oriented command and the Reset-oriented command, there exists no return value, and the SCSI-command return value 120 becomes "GOOD" without fail.

As contact methods between the SCSI-command trap module 3020 and the inter-sites arbitration-emulation control module 3040, there exist an event notice method using a function call and a one using a shared disk. The function-call used event notice method is as follows: The inter-sites arbitration-emulation control module 3040 is executed employing the SCSI-command type 110 and the SCSI-command return value 120 as an argument. Next, the SCSI-command trap module 3020 receives the SCSI-command return value as its return value. Meanwhile, the shared-disk used event notice method is as follows: The SCSI-command trap module 3020 notifies the inter-sites arbitration-emulation control module 3040 about the trapping of the SCSI command as an event. After having terminated the processing of the SCSI command, the inter-sites arbitration-emulation control module 3040 notifies the SCSI command and the SCSI-command trap module 3020 about the termination of the SCSI command's processing as an event. Moreover, the respective SCSI-command trap modules, which have received the event, make contacts with each other about the information on the SCSI-command type 110 and the SCSI-command return value 120, using the shared disk whose updating and reference are executable from the respective modules.

FIG. 6 is a state transition diagram between the volume pair-state (: pair status) and the pair operations. This state transition explains contact contents 3060 between the remote-copy control module 3030 and the inter-sites arbitration-emulation control module 3040 in FIG. 4. The volume pair-status is managed in the control modules within the storage device system 1020 (e.g., storage device system 1020a or 1020b in FIG. 1 to FIG. 3) as the volume pair-state of the remote copy. The pair operations are pair operations for the remote-copy pair performed by the remote-copy control module 3030 (FIG. 4) within the high-rank apparatus 1000.

In FIG. 6, the volume pair-status includes "pair-division status" 5050, "copy-source status" 5060, and "copy-destination status" 5070. The "pair-division status" 5050 indicates the status of a volume whose remote copy has been not made. With respect to a volume in this status, a high-rank apparatus connected to this volume falls into a state of finding a Read/Write access thereto permissible.

As the "pair-division status" 5050, depending on the storage device system 1020, there exist the following statuses: A status where modified difference data of data at the time of the pair division is memorized in advance within a bit map or the like, and where the time shortening can be implemented at the time of the pair re-synchronization, a status which becomes the pair status without making the copy newly at the time of the pair re-synchronization after the division, a status where the remote copy needs to be created from the copy of the all the data in the volume at the time of the pair re-synchronization.

The "copy-source status" 5060 is the pair status of a volume which becomes the copy source of the remote-copy pair. With respect to a volume in the "copy-source status" 5060, a high-rank apparatus connected to this volume is in a state of finding a Read/Write access thereto permissible. In this pair status, if this volume has been modified, the copy-destination volume is updated in the modified contents.

The copy-destination status" 5070 becomes the pair with the "copy-source status" 5060. The volume contents of the "copy-source status" 5060 are reflected on a volume in the "copy-destination status" 5070 in a synchronous or asynchronous manner. With respect to the volume in the "copy-destination status" 5070, the high-rank apparatuses connected to this volume find a Write access thereto impermissible. Concerning a Read access thereto, some of the high-rank apparatuses find the Read access thereto permissible, and the others not.

Next, state transitions 5100 and 5110 as to the state transition "pair-formation instruction" will be explained. It is assumed that the pair-status initial state of each of the volumes scheduled to form the remote-copy pair is the "pair-division status" 5050. If the "pair-formation instruction" has been issued, the pair status of a volume within the storage device system 1020 (e.g., 1020a or 1020b in FIG. 2 and FIG. 3), to which a high-rank apparatus to which the "pair-formation instruction" has been issued is connected, becomes the "copy-source status" 5060 (i.e., state transition 5100). The pair status of a volume which forms the remote-copy pair within the other storage device system becomes the "copy-destination status" 5070 from the "pair-division status" 5050 (i.e., state transition 5110).

Next, state transitions 5200 and 5210 as to the state transition "pair-division instruction" will be explained. It is assumed that the copy-pair volumes which have already formed the remote-copy pair are the "copy-source status" 5060 and the "copy-destination status" 5070. Here, if the "pair-division instruction" has been issued from a high-rank apparatus connected to a volume whose volume pair-status indicates the "copy-source status" 5060, the pair state of the "copy-source status" 5060 and that of the "copy-destination status" 5070 before the pair operations become the "pair-division status" 5050 both (i.e., state transition 5200 and state transition 5210). Also, if the "pair-division instruction" has been issued from a high-rank apparatus connected to a volume whose volume pair-status indicates the "copy-destination status" 5070, similarly in the above-described case, the pair state of the "copy-source status" 5060 and that of the "copy-destination status" 5070 before the pair operations become the "pair-division status" 5050 both (i.e., state transition 5200 and state transition 5210).

FIG. 7 is an explanatory diagram of a Lock-state table of the Lock emulation performed by the arbitration-emulation software in the embodiment 1 of the present invention. Namely, FIG. 7 illustrates the state table of the arbitration-emulation software 1050 (1050a to 1050d) illustrated in FIG. 2. In the present embodiment, using an arbitration-disk SCSI Reserve state 220 of the arbitration volume 1030 (i.e., arbitration-purpose disk 1030 in FIG. 4) and a pair status 230 of the arbitration volume, the win-or-lose by the in-site arbitration and the win-or-lose by the inter-sites arbitration are determined. In the present embodiment, the high-rank apparatus 1000 which has finally won the arbitration with the utilization of the in-site arbitration and the inter-sites arbitration becomes a single high-rank apparatus (i.e., high-rank apparatus 1000a in FIG. 2).

In the present embodiment, the present invention has been explained by selecting the cluster software MSCS as the example. Accordingly, a node which has won the arbitration by the MSCS locks the arbitration-purpose disk 1030 (FIG. 4). Namely, in FIG. 4, the cluster disk driver 3010 within the high-rank apparatus 1000 sets the arbitration-purpose disk 1030 into a SCSI Reserve state. A SCSI Reserve state 210 of the arbitration-purpose disk 1030, i.e., the arbitration volume in the present embodiment, includes a self-node Lock state 250, an other-node Lock state 260, a no-Lock status (any node is not in Lock state) 270, and in-transition states.

The self-node Lock state 250 is a state where the self high-rank apparatus has allowed the Reserve of the arbitration-purpose disk 1030. Namely, the self-node Lock state 250 is a state where, within one and the same site, the arbitration-purpose disk 1030 is in the SCSI Reserve state, and where the pair status of the arbitration volume (i.e., arbitration-purpose disk) is the "copy-source status" 5060 explained in FIG. 6.

The other-node Lock state 260 is a state where the other high-rank apparatus has allowed the Reserve of the arbitration-purpose disk 1030. Namely, the other-node Lock state 260 is a state where the pair status of the arbitration-purpose disk 1030 in a high-rank apparatus within the other site is the "copy-source status" 5060, and where the pair status of the arbitration-purpose disk 1030 within the self site is the "copy-destination status" 5070. Otherwise, the other-node Lock state 260 is a state where the other high-rank apparatus within the self site sets the arbitration-purpose disk 1030 into the SCSI Reserve state, and where the pair status of the arbitration-purpose disk 1030 within the self site is the "copy-source status" 5060.

The no-Lock status 270 is a state where none of the nodes has allowed the Reserve of the arbitration-purpose disk 1030. The no-Lock status 270 includes the following three states: A state where all the high-rank apparatuses have no Lock, a state where a certain high-rank apparatus is in transition of performing the Lock, and a state where a certain high-rank apparatus is in transition of releasing the Lock. The state where all the high-rank apparatuses have no Lock is a case where the arbitration-disk Reserve state 220 is a Non-Reserve state, and where the pair status is the "pair-division status" 5050.

The two cases of the in-transition states are as follows: A state where, although the pair status is the "pair-division status" 5050, a certain high-rank apparatus sets the arbitration-purpose disk into the SCSI Reserve state. Otherwise a state where the pair status 230 of the arbitration-purpose disk 1030 in the self-high-order-device side site is the "copy-source status" 5060, and where the SCSI Reserve state 220 of the arbitration-purpose disk 1030 within the self site is the Non-Reserve state.

The present embodiment is implemented by performing control flows which will be explained in FIG. 8, FIG. 9, FIG. 10, and FIG. 11 below. These control flows are performed in the arbitration-emulation software 1050 in order to inform the cluster disk driver in FIG. 4 of the Reserve state 220 of the arbitration-purpose disk 1030 explained in FIG. 7.

FIG. 8 is a flowchart for explaining the entire control flow in the embodiment 1 of the present invention. Referring to FIG. 4, the flowchart in FIG. 8 will be explained below. FIG. 8 is the processing flow concerning the following control: At first, the SCSI command is issued from the cluster disk driver 3010. Next, the processing to the SCSI command issued is performed in the arbitration-emulation software 1050. Finally, the return value of the SCSI command is set into the cluster disk driver 3010, i.e., the SCSI-command issuing source.

In FIG. 8, the processing flow performed by the SCSI-command trap module 3020 will be explained below. At a step 7000, the SCSI-command trap module 3020 performs the trapping of the SCSI command issued by the cluster disk driver 3010. After the trapping of the SCSI command, the processing is transferred to a step 7010. At the step 7010, the SCSI command trapped at the step 7000 is issued to the arbitration-purpose disk 1030 within the storage device system 1020 (e.g., storage device system 1020, 1020a, or 1020b in FIG. 1 to FIG. 3) connected to the high-rank apparatus which is in processing the SCSI command. The return value of this SCSI command from the arbitration-purpose disk 1030 is caught by the SCSI-command trap module 3020. Then, the processing is transferred to a step 7020.

At the step 7020, a judgment is made on the return value of the SCSI command acquired at the step 7020 from the arbitration-purpose disk 1030. If the return value is "Conflict", the processing is transferred to a step 7040. Meanwhile, if the return value is "GOOD" or "ERROR", the return value of the SCSI command is set as the contents of the contact contents (FIG. 5) between the SCSI-command trap module 3020 and the inter-sites arbitration-emulation control module 3040. After the setting of this contact contents has been terminated, the processing is transferred to a step 7030. The processing at the step 7030 becomes a processing to be performed in the inter-sites arbitration-emulation control module 3040. The processing flow at the step 7030 will be explained later in FIG. 9, FIG. 10, and FIG. 11.

After the step 7030 has been terminated, the processing is transferred to the step 7040. At the step 7040, the return value of the SCSI command received at the step 7020, or the contact contents (refer to FIG. 5) between the SCSI-command trap module 3020 and the inter-sites arbitration-emulation control module 3040, which has been set in the inter-sites arbitration-emulation control module processing, is set as the return value of the SCSI command trapped at the step 7000 (: the return value of the SCSI command is set (1)). After the step 7040 has been terminated, the cluster disk driver 3010 is capable of receiving the return value of the SCSI command that the driver had issued.

As described above, if, at the step 7020, the return value is "GOOD" or "ERROR", the processing is transferred to the step 7030. Here, with respect to the status "ERROR", the reason for transferring the processing to the step 7030 in the case of "ERROR" can be considered as the following case: If the writing into the disk has failed in the pair status "copy-destination status" 5070 (refer to FIG. 6) of the remote-copy pair, the status "Conflict" has been not returned. In the present embodiment, the pair status of the remote-copy pair is performed in a manner of being combined with the exclusive control using the SCSI protocol. As a result, unless the writing failure is returned in a status where the Reserve state is accurately represented by "Conflict" as the return value of the SCSI command, software which runs in a high-order position (e.g., MSCS in the present embodiment) finds it impossible to operate normally.

Figure 9:
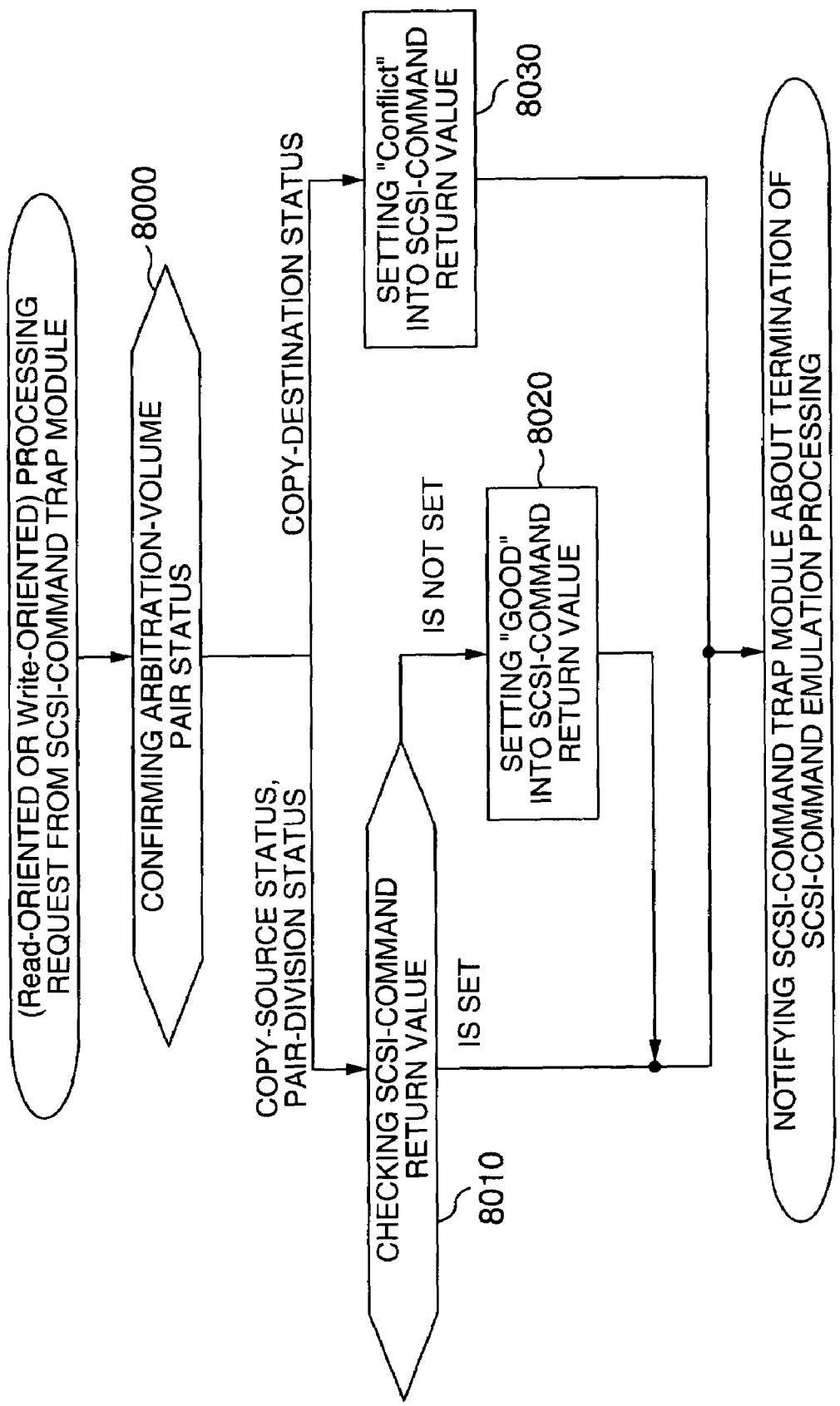
FIG. 9 is a processing control flowchart in the inter-sites arbitration-emulation control module for a Read-oriented or Write-oriented command of SCSI command.
Figure 10:
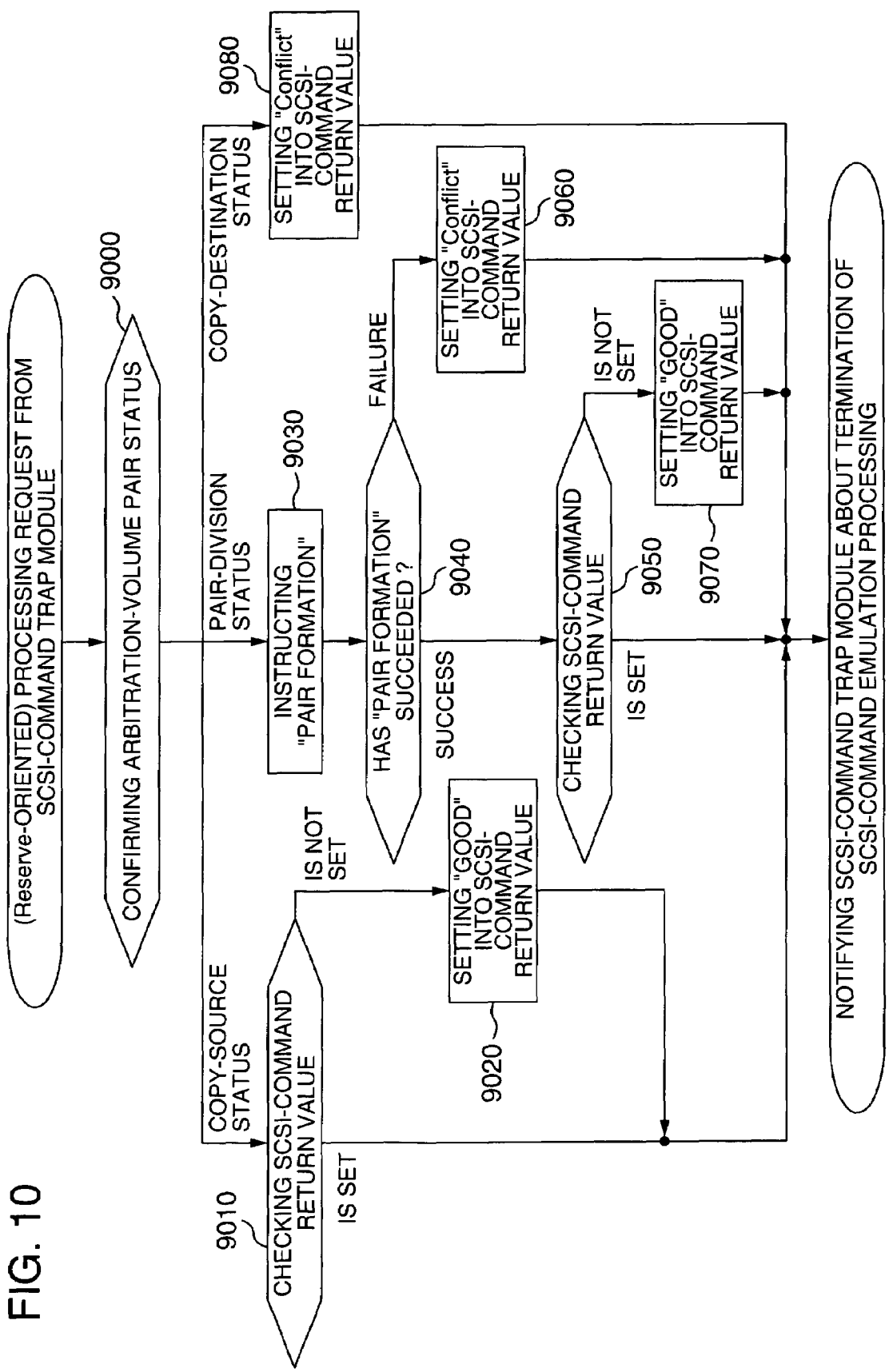
FIG. 10 is a processing control flowchart in the inter-sites arbitration-emulation control module for a Reserve-oriented command of the SCSI command.
Figure 11:
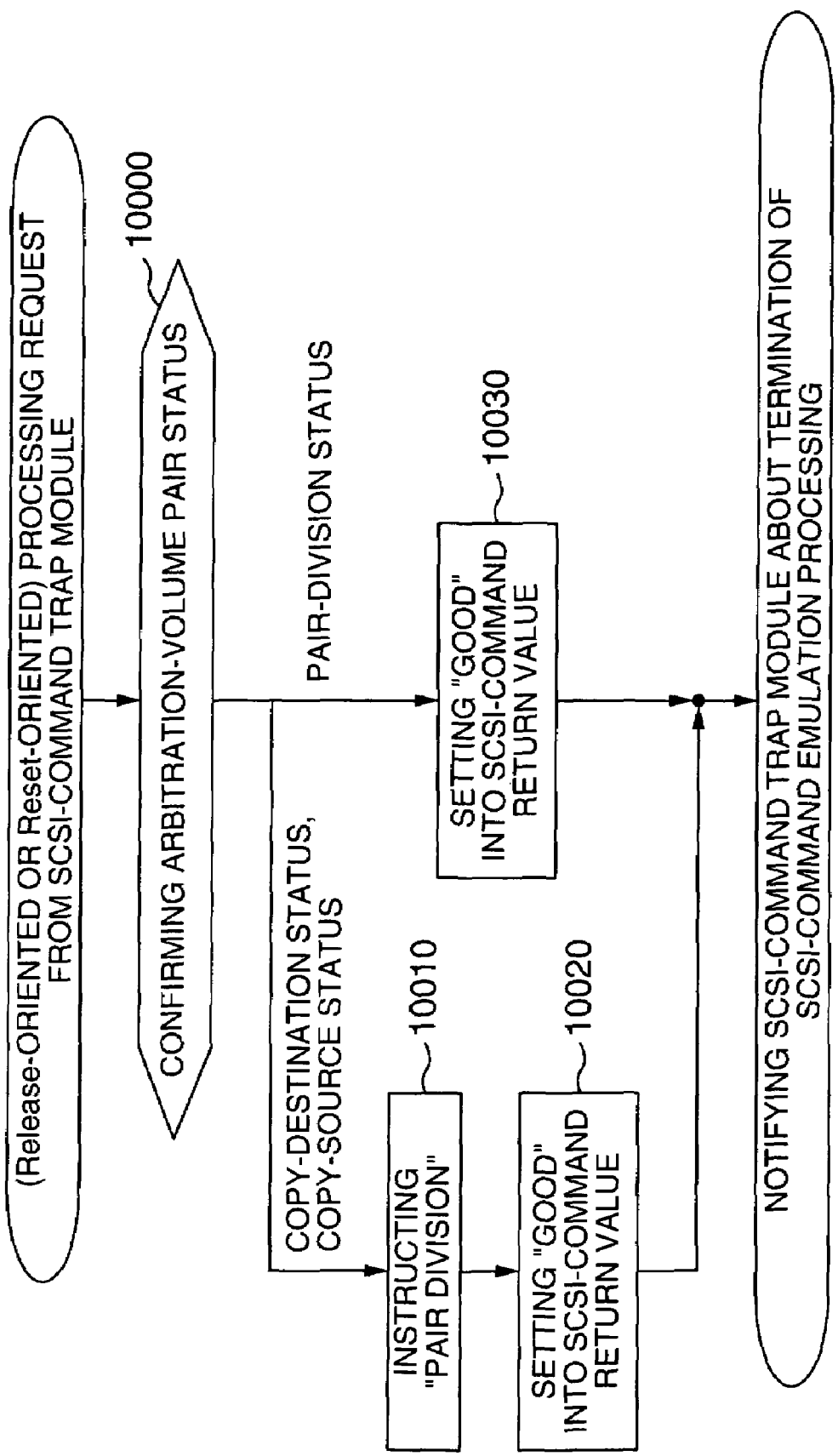
FIG. 11 is a processing control flowchart in the inter-sites arbitration-emulation control module for a Release-oriented or Reset-oriented command of the SCSI command.

FIG. 9, FIG. 10, and FIG. 11 are control flowcharts of the processing (i.e., step 7030 in FIG. 8) in the inter-sites arbitration-emulation control module 3040. FIG. 9 is a control flowchart of the inter-sites arbitration-emulation control module processing for a Read-oriented or Write-oriented command of the SCSI command. When the inter-sites arbitration-emulation control module 3040 in FIG. 4 starts the processing for the Read-oriented or Write-oriented SCSI command, a step 8000 is executed at first. At the step 8000, the "pair-status confirmation" pair operation for confirming the state of the remote-copy pair is performed by the inter-sites arbitration-emulation control module 3040 via the remote-copy control module 3030. After the above-described pair operation has been terminated, in the case of the pair status "copy-source status" 5060 and "pair-division status" 5050 explained in FIG. 6, the processing is transferred to a step 8010. Also, in the case of the pair status "copy-destination status" 5070, the processing is transferred to a step 8030.

At the step 8010, the contact contents (FIG. 5) between the SCSI-command trap module 3020 and the inter-sites arbitration-emulation control module 3040 is checked. If the return value 120 of the SCSI command has been not set therein, the processing is transferred to a step 8020. Meanwhile, if the SCSI-command return value 120 has been set therein, the processing in the inter-sites arbitration-emulation control module 3040 is terminated, and then the processing is brought back to the SCSI-command trap module 3020. At the step 8020, "GOOD" is set into the SCSI-command return value 120. After the setting into the SCSI-command return value 120 has been terminated, the processing is brought back to the SCSI-command trap module 3020.

At a step 8030, as the contact contents (FIG. 5) between the SCSI-command trap module 3020 and the inter-sites arbitration-emulation control module 3040, "Conflict" is set into the SCSI-command return value 120. After the setting into the SCSI-command return value 120 has been terminated, the processing in the inter-sites arbitration-emulation control module 3040 is terminated, and then the processing is brought back to the SCSI-command trap module 3020.

FIG. 10 is a control flowchart of the inter-sites arbitration-emulation control module processing for a Reserve-oriented command of the SCSI command. When the inter-sites arbitration-emulation control module 3040 in FIG. 4 starts the processing for the Reserve-oriented SCSI command, a step 9000 is executed at first. At the step 9000, the "pair-status confirmation" pair operation for confirming the state of the remote-copy pair is performed by the inter-sites arbitration-emulation control module 3040 via the remote-copy control module 3030. After the above-described pair operation has been terminated, in the case where the arbitration-volume pair status is the "copy-source status" 5060 (refer to FIG. 6), the processing is transferred to a step 9010. In the case of the "pair-division status" 5050, the processing is transferred to a step 9030. In the case of the "copy-destination status" 5070, the processing is transferred to a step 9080.

At the step 9010, the contact contents (FIG. 5) between the SCSI-command trap module 3020 and the inter-sites arbitration-emulation control module 3040 is checked. If the return value 120 of the SCSI command has been not set therein, the processing is transferred to a step 9020. Meanwhile, if the SCSI-command return value 120 has been set therein, the processing in the inter-sites arbitration-emulation control module 3040 is terminated, and then the processing is brought back to the SCSI-command trap module 3020. At the step 9020, "GOOD" is set into the SCSI-command return value 120. After the setting into the SCSI-command return value 120 has been terminated, the processing is brought back to the SCSI-command trap module 3020.

At the step 9030, the "pair-formation instruction" pair operation for performing the formation of the remote-copy pair is performed by the inter-sites arbitration-emulation control module 3040 via the remote-copy control module 3030. After the above-described pair operation has been terminated, the processing is transferred to a step 9040. At the step 9040, the processing is branched, depending on the success or failure of the "pair-formation instruction" pair operation performed at the step 9030. Namely, if the "pair-formation instruction" pair operation has succeeded, the processing is transferred to a step 9050. If the pair operation has failed, the processing is transferred to a step 9060. At the step 9050, the contact contents (FIG. 5) between the SCSI-command trap module 3020 and the inter-sites arbitration-emulation control module 3040 is checked. If the SCSI-command return value 120 has been not set therein, the processing is transferred to a step 9070.

Meanwhile, if the SCSI-command return value 120 has been set therein, the processing in the inter-sites arbitration-emulation control module 3040 is terminated, and then the processing is brought back to the SCSI-command trap module 3020. At the step 9070, "GOOD" is set into the SCSI-command return value 120. After the setting into the SCSI-command return value 120 has been terminated, the processing is brought back to the SCSI-command trap module 3020. At the step 9060, "Conflict" is set into the SCSI-command return value 120. After the setting into the SCSI-command return value 120 has been terminated, the processing is brought back to the SCSI-command trap. At the step 9080, "Conflict" is set into the SCSI-command return value 120. After the setting into the SCSI-command return value 120 has been terminated, the processing is brought back to the SCSI-command trap module 3020.

FIG. 11 is a control flowchart of the inter-sites arbitration-emulation control module processing for a Release-oriented or Reset-oriented command of the SCSI command. When the inter-sites arbitration-emulation control module 3040 starts the processing for the Release-oriented or Reset-oriented SCSI command, a step 10000 is executed at first. At the step 10000, the "pair-status confirmation" pair operation for confirming the state of the remote-copy pair is performed by the inter-sites arbitration-emulation control module 3040 via the remote-copy control module 3030. After the above-described pair operation has been terminated, in the case of the pair status "copy-source status" 5060 and "copy-destination status" 5070 explained in FIG. 6, the processing is transferred to a step 10010. Also, in the case of the pair status "pair-division status" 5050, the processing is transferred to a step 10030.

At the step 10010, the "pair-division instruction" pair operation for performing the division of the remote-copy pair is performed by the inter-sites arbitration-emulation control module 3040 via the remote-copy control module 3030. After the above-described pair operation has been terminated, the processing is transferred to a step 10020. At the step 10020, "GOOD" is set into the SCSI-command return value 120. After the setting into the SCSI-command return value 120 has been terminated, the processing is brought back to the SCSI-command trap module 3020. At the step 10030, "GOOD" is set into the SCSI-command return value 120. After the setting into the SCSI-command return value 120 has been terminated, the processing is brought back to the SCSI-command trap module 3020.

The embodiment 1 explained so far makes it possible to provide the computer system that allows the implementation of the arbitration which is preferable for the shared-disk model using the volumes for making the remote copy into remote districts. Here, the arbitration is implemented in the shared-disk model cluster system using the plural high-rank apparatuses including the volumes for making the remote copy into remote districts.

Embodiment 2

Figure 12:
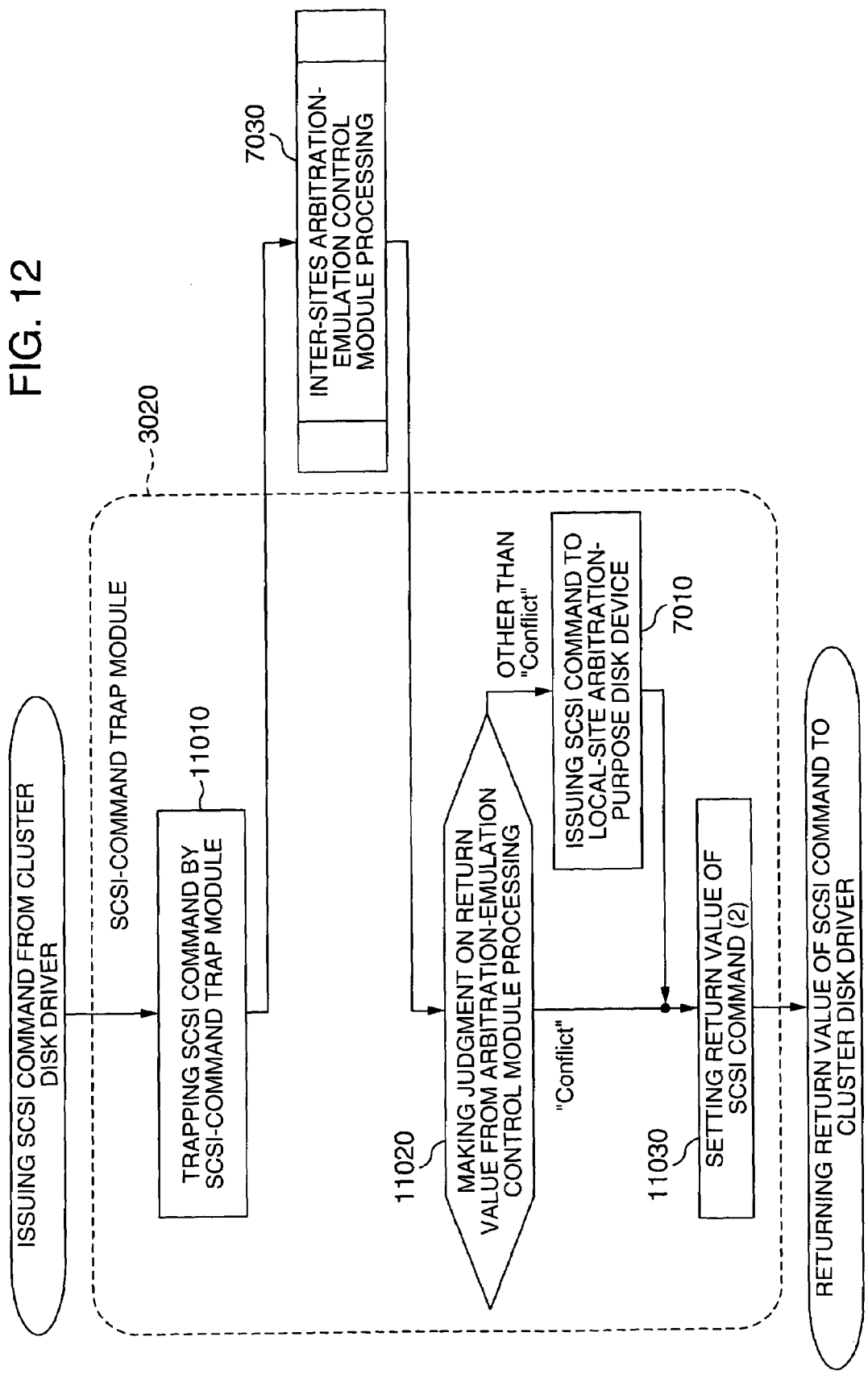
FIG. 12 is a flowchart for explaining the entire control flow in an embodiment 2 of the present invention.

In the above-described embodiment 1, the control over the arbitration-emulation software 1050 is performed using the control flow explained in FIG. 8. Namely, the control in the embodiment 1 is performed in accordance with the following sequence: At first, the SCSI command issued by the cluster disk driver 3010 is issued to the arbitration-purpose disk 1030 within the self site. At the next stage, the processing is transferred to the inter-sites arbitration-emulation control module 3040. In contrast thereto, the control flow devised in an embodiment 2 is as follows:

FIG. 12 is a flowchart for explaining the entire control flow in the embodiment 2 of the present invention. In the embodiment 2, in substitution for the control flow in FIG. 8 in the embodiment 1, the control over the arbitration-emulation software 1050 is performed using the control flow indicated in FIG. 12. The control flow indicated in FIG. 12 is as follows: At first, the SCSI command is issued from the cluster disk driver 3010 in FIG. 4. Next, the processing to the SCSI command issued is performed in the arbitration-emulation software 1050. Finally, the return value of the SCSI command is set into the cluster disk driver 3010, i.e., the SCSI-command issuing source.

In the flowchart in FIG. 12, the processing flow performed by the SCSI-command trap module 3020 will be explained below. In the SCSI-command trap module 3020 of the present embodiment, at a step 11010, the module 3020 performs the trapping of the SCSI command issued by the cluster disk driver 3010. After the trapping of the SCSI command, the processing is transferred to a step 7030. After the processing at the step 7030 has been terminated, the processing is transferred to a step 11020.

At the step 11020, a judgment is made on the return value 120 of the SCSI command of the contact contents (refer to FIG. 5) between the SCSI-command trap module 3020 and the inter-sites arbitration-emulation control module 3040 set in the inter-sites arbitration-emulation control module processing at the step 7030. In the judgment on the SCSI-command return value 120, if the status "Conflict" has been set therein, the processing is transferred to a step 11030 (:the SCSI-command return value 120 is set (2)). Meanwhile, if a status other than "Conflict" has been set therein, the processing is transferred to a step 7010. After the processing at the step 7010 has been terminated, the processing is transferred to the step 11030.

At the step 11030, the SCSI-command return value received from the cluster disk driver 3010 at the step 7010, or the contact contents (FIG. 5) between the SCSI-command trap module 3020 and the inter-sites arbitration-emulation control module 3040 set in the inter-sites arbitration-emulation control module processing 7030 is set as the SCSI-command return value trapped at the step 11010. After the processing at the step 11030 has been terminated, the cluster disk driver 3010 is capable of receiving the SCSI-command return value that the driver had issued.

The embodiment 2 explained so far also makes it possible to provide the computer system that allows the implementation of the arbitration which is preferable for the shared-disk model using the volumes for making the remote copy into remote districts. Here, the arbitration is implemented in the shared-disk model cluster system using the plural high-rank apparatuses including the volumes for making the remote copy into remote districts.

Embodiment 3

The controls implemented in the embodiment 1 and the embodiment 2 have been performed as follows: Regardless of the SCSI-command type described earlier, the processings of the SCSI command trapped in the SCSI-command trap module 3020 are performed by performing the two steps in accordance with the determined sequence, i.e., the step of issuing the SCSI command to the arbitration-purpose disk 1030 within the self site, and the step of the processing in the inter-sites arbitration-emulation control module 3040. In contrast thereto, in an embodiment 3, the control is performed such that this processing sequence is changed on each SCSI-command type basis.

For example, with respect to the "Reserve" command, the "Reset" command, and the "Release" command of the SCSI command, the control is performed which uses the processing flow in FIG. 8. Namely, if the "Reserve" command, the "Reset" command, and the "Release" command are trapped in the SCSI-command trap module 3020, the control is transferred to the processing at the step 7010 of issuing the SCSI command to the local-site arbitration-purpose disk. Also, with respect to the "Read" command and the "Write" command of the SCSI command, the control is performed which uses the processing flow in FIG. 12. Namely, if the "Read" command and the "Write" command are trapped in the SCSI-command trap module 3020, the control is transferred to the processing at the step 7030 of the processing in the inter-sites arbitration-emulation control module 3040. This kind of processing is performed in the embodiment 3.

In this way, according to the embodiment 3, in addition to the effects by the embodiment 1 and the embodiment 2, the processing sequence is changed on each SCSI-command type basis. This condition provides a processing sequence which is suitable for an environment of the system. Accordingly, in many cases, the control is terminated with the employment of only one of the two processing steps, i.e., the step of issuing the SCSI command to the arbitration-purpose disk 1030 within the self site, and the step of the processing in the inter-sites arbitration-emulation control module 3040. This makes it possible to improve the performance of the entire system.

Embodiment 4

Figure 13:
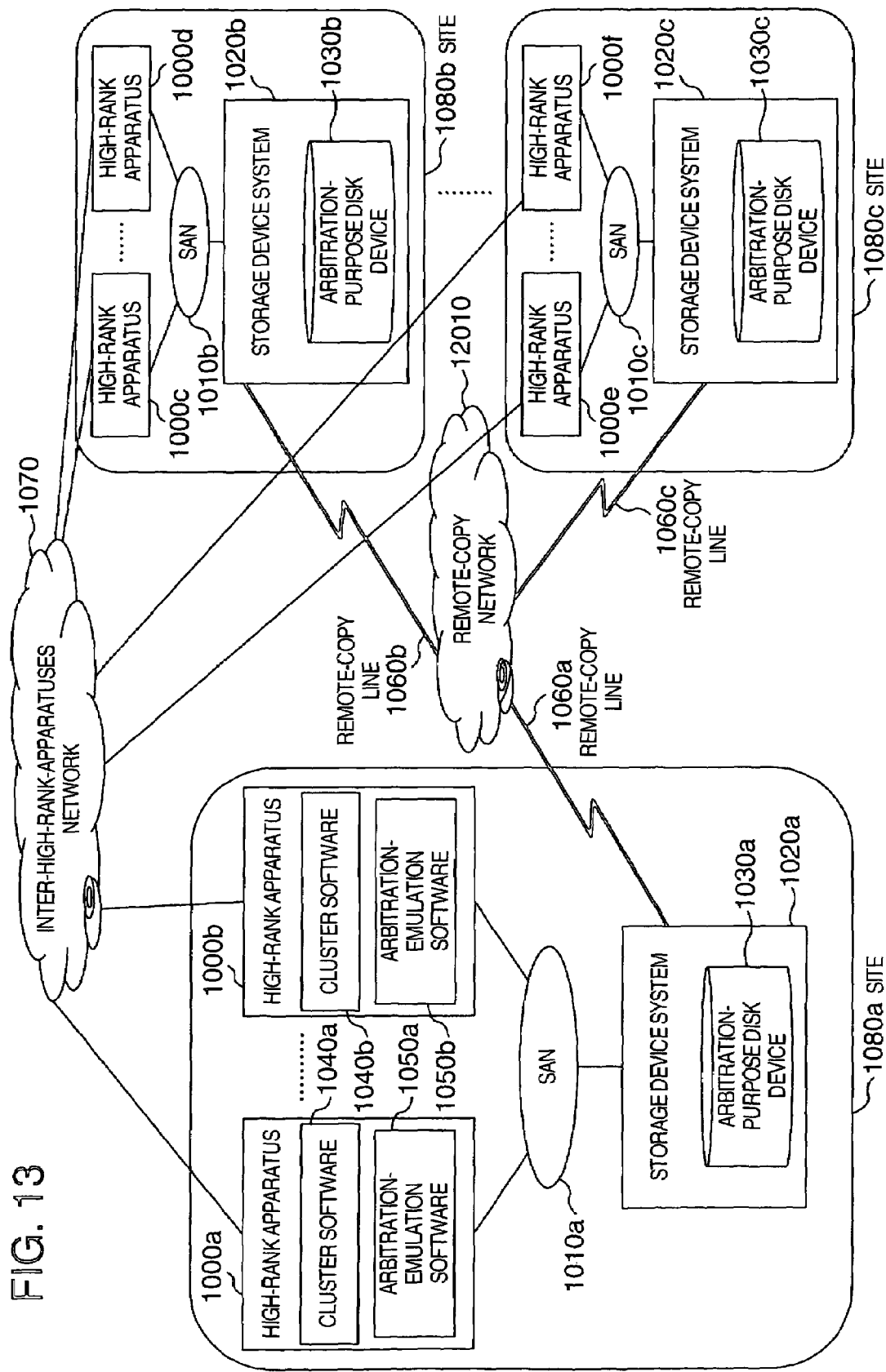
FIG. 13 is a configuration diagram of a computer system for explaining an embodiment 4 of the present invention.

FIG. 13 is a configuration diagram of a computer system for explaining an embodiment 4 of the present invention. In the embodiment 1, the embodiment 2, and the embodiment 3, the explanation has been given concerning the embodiments in the two-site remote-copy environment. In the embodiment 4, the present invention is carried out to a remote-copy environment in a computer system including plural sites as illustrated in FIG. 13. Reference numerals in FIG. 13 which are the same as those in FIG. 2 correspond to the same function components. Incidentally, in FIG. 13, in addition to the sites 1080a and 1080b in FIG. 2, a site 1080c, . . . are connected thereto via the inter-high-order-devices network 1070. Simultaneously, remote-copy lines 1060a, 1060b, and 1060c of the respective sites are connected to each other via a remote-copy network 12010.

Namely, the storage device systems 1020 (1020a, 1020b, and 1020c) of the respective sites are connected to each other via the remote-copy lines 1060 (1060a, 1060b, and 1060c) and the remote-copy network 12010. Only one arbitration-purpose disk 1030 finds it possible to become the "copy-source status" 5060 explained in FIG. 6. Consequently, as is the case with the explanation in the embodiment 1, the utilization of the in-site arbitration and the inter-sites arbitration makes it possible to determine a high-rank apparatus 1000 which has won an arbitration.

According to the present embodiment, in addition to the effects by the embodiment 1 to the embodiment 3, the following effect can be acquired: Namely, in the computer system including three or more sites as well, it becomes possible to determine a single high-rank apparatus 1000 which, based on the in-site and inter-sites arbitrations, has acquired the control right of the cluster system under the remote-copy environment.

In the embodiment 1, the embodiment 2, and the embodiment 3, the explanation has been given regarding the remote-copy environment application of the shared/exclusive control on the arbitration using the Lock-oriented command of the SCSI protocol. A modified embodiment which will be explained hereinafter results from applying the present invention to a Lock-controlled remote-copy environment using the Lock file within the shared volume of being not the SCSI protocol. The application of the shared/exclusive control using the Lock file to the remote-copy environment requires the following replacements: The SCSI-command trap module 3020 explained in FIG. 4 is replaced by a module for monitoring the Lock file, and the arbitration-disk SCSI Reserve state 220 in the Lock state of the arbitration volume illustrated in FIG. 7 is replaced by the Lock state of the Lock file.

For example, the SCSI-command trap module 3020 is replaced by the module for monitoring the Lock file. The processings 7000 and 11010 of performing the trapping of the SCSI command by the SCSI-command trap module are replaced by a processing of monitoring an access to the Lock file. Also, the processing 7010 of issuing the SCSI command to the local-site arbitration-purpose disk is replaced by a processing of performing the writing processing of the Lock file into the shared disk, the deletion processing thereof, the existence confirmation thereof, and the like. Also, the processings 7040 and 11030 of setting the return value of the SCSI command are replaced by a processing of setting the return value of a request for the access to the Lock file, and a processing of setting the results of the Lock-file writing processing, deletion processing, and existence confirmation. Here, if there exists a Lock file that the self high-rank apparatus has written therein, assuming that the self high-rank apparatus is a system which is performing the Lock, the state where the self high-rank apparatus is performing the Lock becomes the following state: In the self-node Lock state 250 explained in FIG. 7, there exists a self-node Lock file, and the pair status 230 of the arbitration volume is the "copy-source status".

According to the present modified embodiment, the addition of the replacements like this allows the already-existing Lock control to be performed for the in-site Lock. Consequently, the high-rank apparatus which has performed the in-site Lock finds it possible to perform the inter-sites arbitration. This makes it possible to apply the shared/exclusive control using the Lock file to the remote-copy environment.

The embodiment 1, the embodiment 2, and the embodiment 3 result from applying the present invention to the remote-copy environment of the shared/exclusive control on the arbitration using the Lock-oriented command of the SCSI protocol. Also, the modified embodiment explained above results from applying the present invention to the remote-copy environment of the shared/exclusive control on the arbitration using the Lock file. In contrast thereto, the present modified embodiment which will be explained hereinafter results from applying the present invention to a Lock-controlled remote-copy environment using a specific Lock sector within the shared volume of being not the SCSI protocol.

In present modified embodiment, the application of the shared/exclusive control using the Lock sector to the remote-copy environment requires the following replacements: The SCSI-command trap module 3020 in FIG. 4 is replaced by a module for monitoring the Lock sector, and the arbitration-disk SCSI Reserve state 220 in the Lock state of the arbitration volume illustrated in FIG. 7 is replaced by the Lock state of the Lock sector.

For example, the SCSI-command trap module 3020 is replaced by the module for monitoring the Lock sector. The processings 7000 and 11010 of performing the trapping of the SCSI command by the SCSI-command trap module are replaced by a processing of monitoring an access to the Lock sector. Also, the processing 7010 of issuing the SCSI command to the local-site arbitration-purpose disk is replaced by a processing of performing the writing processing of the Lock sector into the shared disk, the deletion processing thereof, the existence confirmation thereof, and the like. Also, the processings 7040 and 11030 of setting the return value of the SCSI command are replaced by a processing of setting the return value of a request for the access to the Lock sector, and a processing of setting the results of the Lock-sector writing processing, deletion processing, and existence confirmation. Here, if the ID of the self high-rank apparatus has been written into the Lock sector, assuming that the self high-rank apparatus is a system which is performing the Lock, the state where the self high-rank apparatus is performing the Lock becomes the following state: In the self-node Lock state 250 explained in FIG. 7, the ID of the self node exists in the Lock sector, and the pair status 230 of the arbitration volume is the "copy-source status".

According to the present modified embodiment, the addition of the replacements like this allows the already-existing Lock control to be performed for the in-site Lock. Consequently, the host which has performed the in-site Lock finds it possible to perform the inter-sites arbitration. This makes it possible to apply the shared/exclusive control using the Lock sector to the remote-copy environment.

The embodiment 1, the embodiment 2, and the embodiment 3 result from applying the present invention to the arbitration volume of the cluster software MSCS. The present modified embodiment which will be explained hereinafter results from applying the present invention to a shared disk managed not by the arbitration volume but by the cluster. The present modified embodiment can also be operated among the sites using the control flow in FIG. 8 or the one in FIG. 12. The explanation of these control flows turns out to be the repeated one, and accordingly will be omitted.

According to the present modified embodiment, it becomes possible to apply, to the remote-copy environment, the shared/exclusive control in the shared disk managed not by the arbitration volume but by the cluster.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A shared/exclusive control scheme in a computer system, wherein said computer system includes two or more sites each of which includes a storage device system connected to a plurality of high-rank apparatuses via a network, said two or more sites being connected to each other via an inter-high-rank-apparatuses network, said storage device systems in said respective two or more sites being connected to each other via remote-copy lines, each of said high-rank apparatuses included in each of said sites including an arbitration-emulation execution unit and a clustering unit, and said shared/exclusive control scheme comprises the two-step arbitration of:

a first step by said arbitration-emulation execution units of executing respective arbitrations within said respective sites thereby to determine respective arbitration-win high-rank apparatuses within said respective sites; and a second step by said arbitration-emulation execution units of executing, among said respective sites, an arbitration among said respective arbitration-win high-rank apparatuses within said respective sites thereby to determine an arbitration-win high-rank apparatus among said respective sites, wherein each of said high-rank apparatuses includes a remote-copy control module, each of said storage device systems including an arbitration-purpose disk device, wherein said clustering unit included in each of said high-rank apparatuses includes a cluster-control main unit and a cluster disk driver, wherein said arbitration-emulation execution unit including a SCSI-command trap module and an inter-sites arbitration-emulation control module, wherein said SCSI-command trap module traps a SCSI command issued from said cluster disk driver, issues said trapped SCSI command to said arbitration-purpose disk device, catches a return value of said trapped SCSI command from said arbitration-purpose disk device and issues said return value to said inter-sites arbitration-emulation control module based on a value indicated by said return value, and wherein said inter-sites arbitration-emulation control module, upon receipt of said return value of said trapped SCSI command from said SCSI-command trap module and volume state of an inter-sites remote-copy pair, causes said trapped SCSI command and said volume state of said inter-sites remote-copy pair, via said remote-copy control module, to correspond to each other in accordance with said value indicated by said return value.

2. A shared/exclusive control scheme in a computer system, wherein said computer system includes two or more sites each of which includes a storage device system connected to a plurality of high-rank apparatuses via a network, said two or more sites being connected to each other via an inter-high-rank-apparatuses network, said storage device systems in said respective two or more sites being connected to each other via remote-copy lines, each of said high-rank apparatuses included in each of said sites including an arbitration-emulation execution unit and a clustering unit, wherein said shared/exclusive control scheme comprises the two-step arbitration of:

a first step by said arbitration-emulation execution units of executing respective arbitrations within said respective sites thereby to determine respective arbitration-win high-rank apparatuses within said respective sites; and a second step by said arbitration-emulation execution units of executing, among said respective sites, an arbitration among said respective arbitration-win high-rank apparatuses within said respective sites thereby to determine an arbitration-win high-rank apparatus among said respective site, wherein each of said high-rank apparatuses includes a remote-copy control module, each of said storage device systems including an arbitration-purpose disk device, wherein each of said high-rank apparatuses includes said clustering unit, said arbitration-emulation execution unit, and at least, a high-rank apparatus processor, a memory, a high-rank apparatus memory disk device, and a disk interface, wherein each of said storage device systems includes said arbitration-purpose disk device, and a host interface intervening therebetween with said high-rank apparatuses, a storage device processor, a physical disk device, a cache memory, a shared memory, and a disk copy interface, wherein said high-rank apparatuses are connected to each of said storage device systems via said network and via said disk interface, wherein a SCSI-command trap module, included in said arbitration-emulation execution unit, traps a SCSI command issued from said clustering unit, issues said trapped SCSI command to said arbitration-purpose disk device, catches a return value of said trapped SCSI command from said arbitration-purpose disk device and issues said return value to an inter-sites arbitration-emulation control module based on a value indicated by said return value, and wherein said inter-sites arbitration-emulation control module, upon receipt of said return value of said trapped SCSI command from said SCSI-command trap module and volume state of an inter-sites remote-copy pair, causes said trapped SCSI command and said volume state of the inter-sites remote-copy pair, via said remote-copy control module, to correspond to each other in accordance with said value indicated by said return value.

3. A computer system equipped with a shared/exclusive control scheme, wherein:

said computer system includes two or more sites each of which includes a storage device system having an arbitration-purpose disk device connected to plural high-rank apparatuses via a network, said two or more sites being connected to each other via an inter-high-rank-apparatuses network, said storage device systems in said respective two or more sites being connected to each other via remote-copy lines, each of said high-rank apparatuses included in each of said sites includes an arbitration-emulation execution unit and a clustering unit, said arbitration-emulation execution unit including a SCSI-command trap module and an inter-sites arbitration-emulation control module, said clustering unit including a cluster-control main unit and a cluster disk driver, said SCSI-command trap module traps a SCSI command issued from said cluster disk driver, issues said trapped SCSI command to said arbitration-purpose disk device, catches a return value of said trapped SCSI command from said arbitration-purpose disk device and issues said return value to said inter-sites arbitration-emulation control module based on a value indicated by said return value, said inter-sites arbitration-emulation control module, upon receipt of said return value of said trapped SCSI command from said SCSI-command trap module and volume state of an inter-sites remote-copy pair, causes said trapped SCSI command and said volume state of said inter-sites remote-copy pair, via said remote-copy control module, to correspond to each other in accordance with said value indicated by said return value, if said value indicated by said return value is "Conflict", said return value of said SCSI command is set, and said return value of said SCSI command is returned to said cluster disk driver, and if said value indicated by said return value is "GOOD" or "ERROR", after said return value has been processed in said inter-sites arbitration-emulation control module, said return value of said SCSI command is returned to said cluster disk driver.

4. The computer system equipped with said shared/exclusive control according to claim 3, wherein:

if a Read-oriented or Write-oriented processing request has been made from said SCSI-command trap module, said inter-sites arbitration-emulation control module performs a "pair-status confirmation" pair operation for confirming state of a remote-copy pair, and, if said pair status is "copy-source status" and "pair-division status", said control module checks whether or not said return value of said SCSI command has been set.

5. The computer system equipped with said shared/exclusive control according to claim 3, wherein:

when said inter-sites arbitration-emulation control module has checked whether or not said return value of said SCSI command has been set, and if said return value of said SCSI command has been not set, after setting "GOOD" into said SCSI-command return value, said control module notifies said SCSI-command trap module about termination of said SCSI-command emulation processing.

6. The computer system equipped with said shared/exclusive control according to claim 3, wherein:

if a Read-oriented or Write-oriented processing request has been made from said SCSI-command trap module, said inter-sites arbitration-emulation control module performs a "pair-status confirmation" pair operation for confirming state of a remote-copy pair, and, if said pair status is "copy-destination status", after setting "Conflict" into said SCSI-command return value, said control module notifies said SCSI-command trap module about termination of said SCSI-command emulation processing.

7. The computer system equipped with said shared/exclusive control according to claim 3, wherein:

if a Reserve-oriented processing request has been made from said SCSI-command trap module, said inter-sites arbitration-emulation control module performs a "pair-status confirmation" pair operation for confirming state of a remote-copy pair, and, if said pair status is "copy-source status", said control module checks said SCSI-command return value, and, if said SCSI-command return value has been set, said control module notifies said SCSI-command trap module about termination of said SCSI-command emulation processing, and if said SCSI-command return value has been not set, after setting "GOOD" into said SCSI-command return value, said control module notifies said SCSI-command trap module about termination of said SCSI-command emulation processing.

8. The computer system equipped with said shared/exclusive control according to claim 3, wherein:

said inter-sites arbitration-emulation control module performs a "pair-status confirmation" pair operation for confirming state of a remote-copy pair, and, if said pair status is "copy-division status", said inter-sites arbitration-emulation control module instructs a pair formation via a remote-copy control module, and, if said pair formation has succeeded, said control module checks said SCSI-command return value, and, if said SCSI-command return value has been set, said control module notifies said SCSI-command trap module about termination of said SCSI-command emulation processing, and, if said SCSI-command return value has been not set, after setting "GOOD" into said SCSI-command return value, said control module notifies said SCSI-command trap module about termination of said SCSI-command emulation processing, and, if said pair formation by said pair formation instruction has failed, after setting "Conflict" into said SCSI-command return value, said control module notifies said SCSI-command trap module about termination of said SCSI-command emulation processing.

9. The computer system equipped with said shared/exclusive control according to claim 3, wherein:

if a Reserve-oriented processing request has been made from said SCSI-command trap module, said inter-sites arbitration-emulation control module performs a "pair-status confirmation" pair operation for confirming state of a remote-copy pair, and, if said pair status is "copy-destination status", after setting "Conflict" into said SCSI-command return value, said control module notifies said SCSI-command trap module about termination of said SCSI-command emulation processing.

10. The computer system equipped with said shared/exclusive control according to claim 3, wherein:

if a Release-oriented or Reset-oriented processing request has been made from said SCSI-command trap module, said inter-sites arbitration-emulation control module performs a "pair-status confirmation" pair operation for confirming state of a remote-copy pair, and, if said pair status is "copy-destination status" and "copy-source status", said inter-sites arbitration-emulation control module instructs a pair division via a remote-copy control module, and, after setting "GOOD" into said SCSI-command return value, said control module notifies said SCSI-command trap module about termination of said SCSI-command emulation processing.

11. The computer system equipped with said shared/exclusive control according to claim 3, wherein:

if said pair status is "copy-division status", said inter-sites arbitration-emulation control module sets "GOOD" into said SCSI-command return value, and then notifies said SCSI-command trap module about termination of said SCSI-command emulation processing.

12. A computer system equipped with a shared/exclusive control scheme, wherein:

said computer system includes two or more sites each of which includes a storage device system having an arbitration-purpose disk device connected to plural high-rank apparatuses via a network, said two or more sites being connected to each other via an inter-high-rank-apparatuses network, said storage device systems in said respective two or more sites being connected to each other via remote-copy lines, each of said high-rank apparatuses included in each of said sites includes an arbitration-emulation execution unit and a clustering unit, said arbitration-emulation execution unit including a SCSI-command trap module and an inter-sites arbitration-emulation control module, said clustering unit including a cluster-control main unit and a cluster disk driver, and said SCSI-command trap module traps a SCSI command issued from said cluster disk driver, issues said trapped SCSI command to said arbitration-purpose disk device, catches a return value of said trapped SCSI command from said arbitration-purpose disk device and issues said return value to said inter-sites arbitration-emulation control module based on a value indicated by said return value, said inter-sites arbitration-emulation control module, upon receipt of said return value of said trapped SCSI command from said SCSI-command trap module and volume state of an inter-sites remote-copy pair, causes said trapped SCSI command and said volume state of said inter-sites remote-copy pair, via said remote-copy control module, to correspond to each other in accordance with said value indicated by said return value, if said return value is "Conflict", said return value of said SCSI command is set, and said return value of said SCSI command is returned to said cluster disk driver, if said return value is "GOOD" or "ERROR", after said return value has been processed in said inter-sites arbitration-emulation control module, said return value of said SCSI command is returned to said cluster disk driver, if a Read-oriented or Write-oriented processing request has been made from said SCSI-command trap module, said inter-sites arbitration-emulation control module performs a "pair-status confirmation" pair operation for confirming state of a remote-copy pair, and if said pair status is "copy-source status" and "pair-division status", said control module checks whether or not said return value of said SCSI command has been set, and if said pair status is "copy-destination status", after setting "Conflict" into said SCSI-command return value, said control module notifies said SCSI-command trap module about termination of said SCSI-command emulation processing.

* * * * *